US010025103B2

United States Patent
Sugihara et al.

(10) Patent No.: US 10,025,103 B2
(45) Date of Patent: Jul. 17, 2018

(54) EYEGLASS-TYPE WEARABLE DEVICE AND FRONT PART OF EYGLASS-TYPE WEARABLE DEVICE

(71) Applicant: OLYMPUS CORPORATION, Tokyo (JP)

(72) Inventors: Ryohei Sugihara, Machida (JP); Seiji Tatsuta, Hachioji (JP); Teruo Tomita, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 51 days.

(21) Appl. No.: 14/680,248

(22) Filed: Apr. 7, 2015

(65) Prior Publication Data

US 2015/0212329 A1 Jul. 30, 2015

Related U.S. Application Data

(63) Continuation of application No. PCT/JP2013/075623, filed on Sep. 24, 2013.

(30) Foreign Application Priority Data

Oct. 24, 2012 (JP) ................................ 2012-234797

(51) Int. Cl.
*G02B 27/01* (2006.01)
*G02C 11/00* (2006.01)
(Continued)

(52) U.S. Cl.
CPC ..... *G02B 27/0176* (2013.01); *G02B 27/0101* (2013.01); *G02B 27/017* (2013.01);
(Continued)

(58) Field of Classification Search
CPC ...... G02C 11/10; G02C 5/146; G02C 5/2209; G02C 7/086; G02C 2200/08; G02C 11/02;
(Continued)

(56) References Cited

U.S. PATENT DOCUMENTS 5,900,720 A * 5/1999 Kallman ................. G02F 1/163
320/103
8,223,088 B1 * 7/2012 Gomez ............... G06F 3/03547
345/7
(Continued)

FOREIGN PATENT DOCUMENTS

JP 3052855 U 10/1998
JP 2001-522063 A 11/2001
(Continued)

OTHER PUBLICATIONS

International Search Report dated Jan. 7, 2014 issued in PCT/JP2013/075623.

*Primary Examiner* — Thomas K Pham
*Assistant Examiner* — Alberto Betancourt
(74) *Attorney, Agent, or Firm* — Scully, Scott, Murphy & Presser, P.C.

(57) ABSTRACT

An eyeglass-type wearable device includes a first temple part positioned along one temporal region of a user, a second temple part positioned along the other temporal region of the user, and a front part positioned in front of the face of the user, when the eyeglass-type wearable device is worn by the user. The front part includes an electrical unit including an imaging device, and a first and second connection sections to which the first and the second temple parts can be connected, and at least one of the first and the second temple parts includes a temple-side electrical unit. The first and second temple parts can be attached to and removed from the first and second connection sections of the front part. Information about an image captured by the imaging device included in the front part is transmitted from the front part to the temple-side electrical unit.

16 Claims, 21 Drawing Sheets

(51) Int. Cl.
*G02C 7/08* (2006.01)
*G02C 5/22* (2006.01)

(52) U.S. Cl.
CPC ........... *G02C 5/2209* (2013.01); *G02C 7/086* (2013.01); *G02C 11/10* (2013.01); *G02B 2027/014* (2013.01); *G02B 2027/0138* (2013.01); *G02B 2027/0152* (2013.01); *G02B 2027/0156* (2013.01); *G02B 2027/0178* (2013.01); *G02C 2200/08* (2013.01)

(58) Field of Classification Search
CPC .......... G02C 5/16; G02C 5/2227; G02C 5/00; G02B 27/01; G02B 27/017; G02B 27/0176; G02B 27/0101; G02B 2027/0156; G02B 2027/0138; G02B 2027/014; G02B 2027/0152; G02B 2027/0178
USPC ............ 351/158, 41, 52, 111, 116–123, 138; 359/13–14, 34, 629–633, 558, 566–569; 345/7–8; 349/11
See application file for complete search history.

(56) References Cited

U.S. PATENT DOCUMENTS

| | | | |
|---|---|---|---|
| 2002/0159023 A1* | 10/2002 | Swab | H04W 56/0015 351/158 |
| 2009/0002626 A1 | 1/2009 | Wakabayashi | |
| 2009/0251661 A1* | 10/2009 | Fuziak, Jr. | G02B 27/0172 351/158 |
| 2010/0309426 A1* | 12/2010 | Howell | G02C 5/143 351/158 |
| 2013/0235328 A1* | 9/2013 | Cauvet | G02C 11/10 351/116 |

FOREIGN PATENT DOCUMENTS

| | | |
|---|---|---|
| JP | 2005-502902 A | 1/2005 |
| JP | 2005-223751 A | 8/2005 |
| JP | 2009-237450 A | 10/2009 |
| JP | 2010-091748 A | 4/2010 |
| JP | 2012-008290 A | 1/2012 |
| JP | 2012-063638 A | 3/2012 |
| WO | WO 99/23524 A1 | 5/1999 |
| WO | WO 02/089496 A2 | 11/2002 |
| WO | WO 2007/099707 A1 | 9/2007 |

* cited by examiner

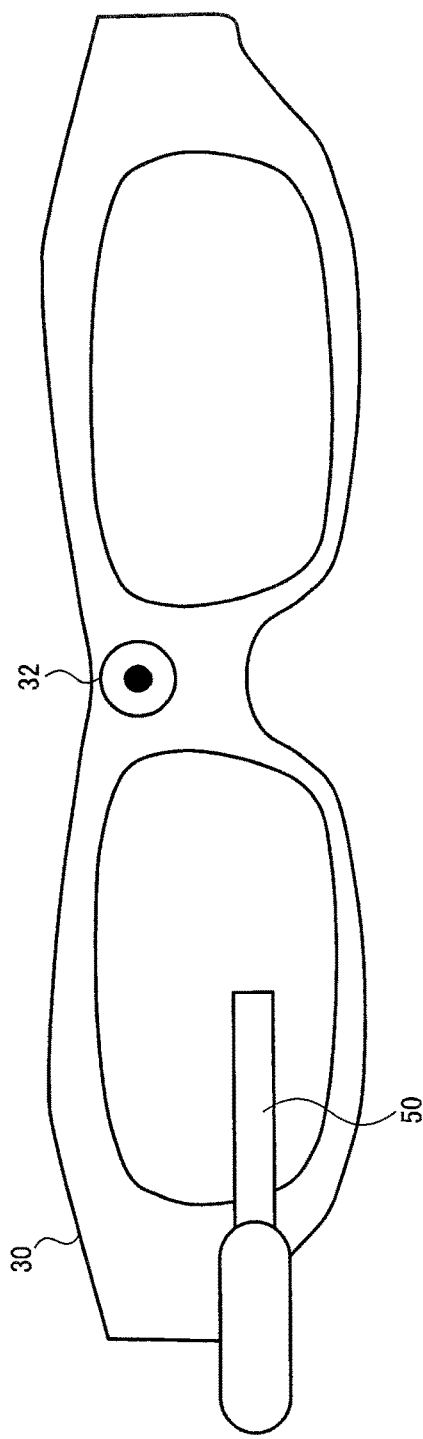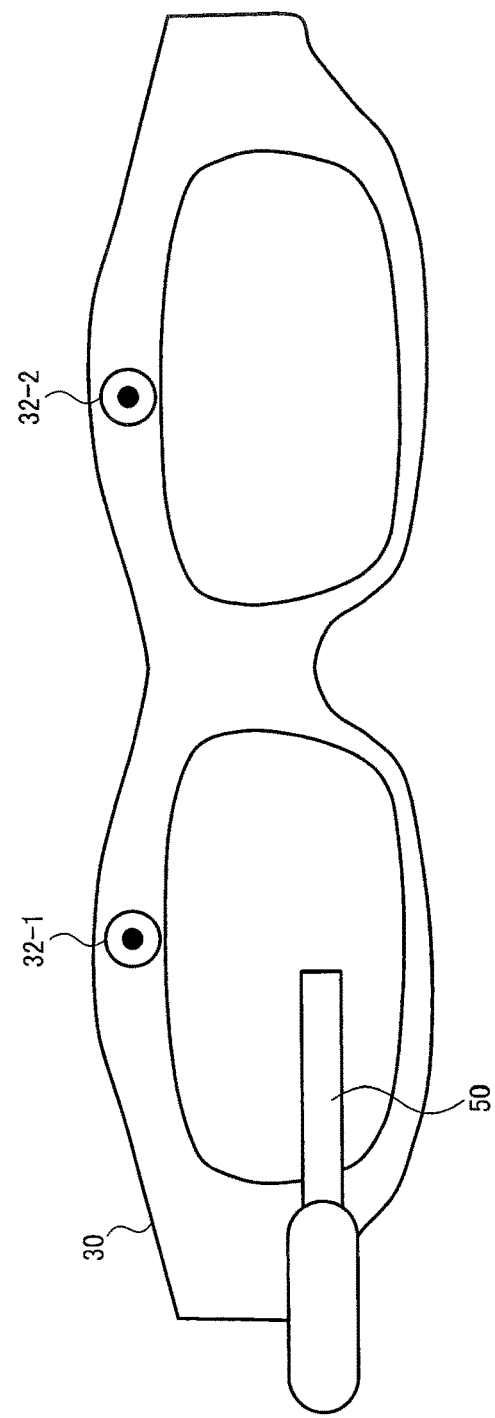
FIG. 2A
FIG. 2B

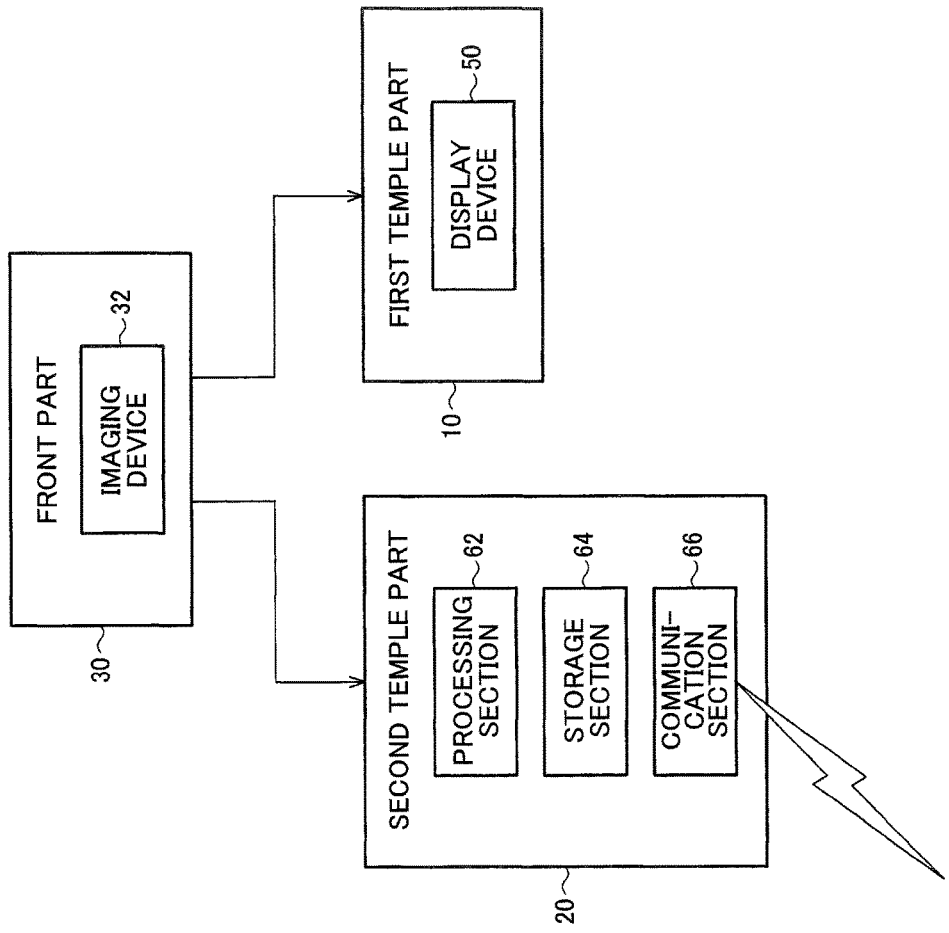
FIG. 5B PARALLEL PROCESSING MODE
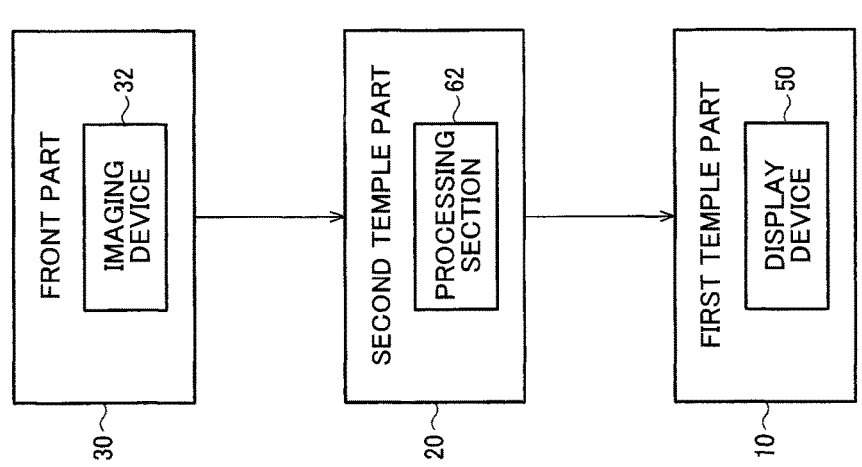
FIG. 5A SERIAL PROCESSING MODE

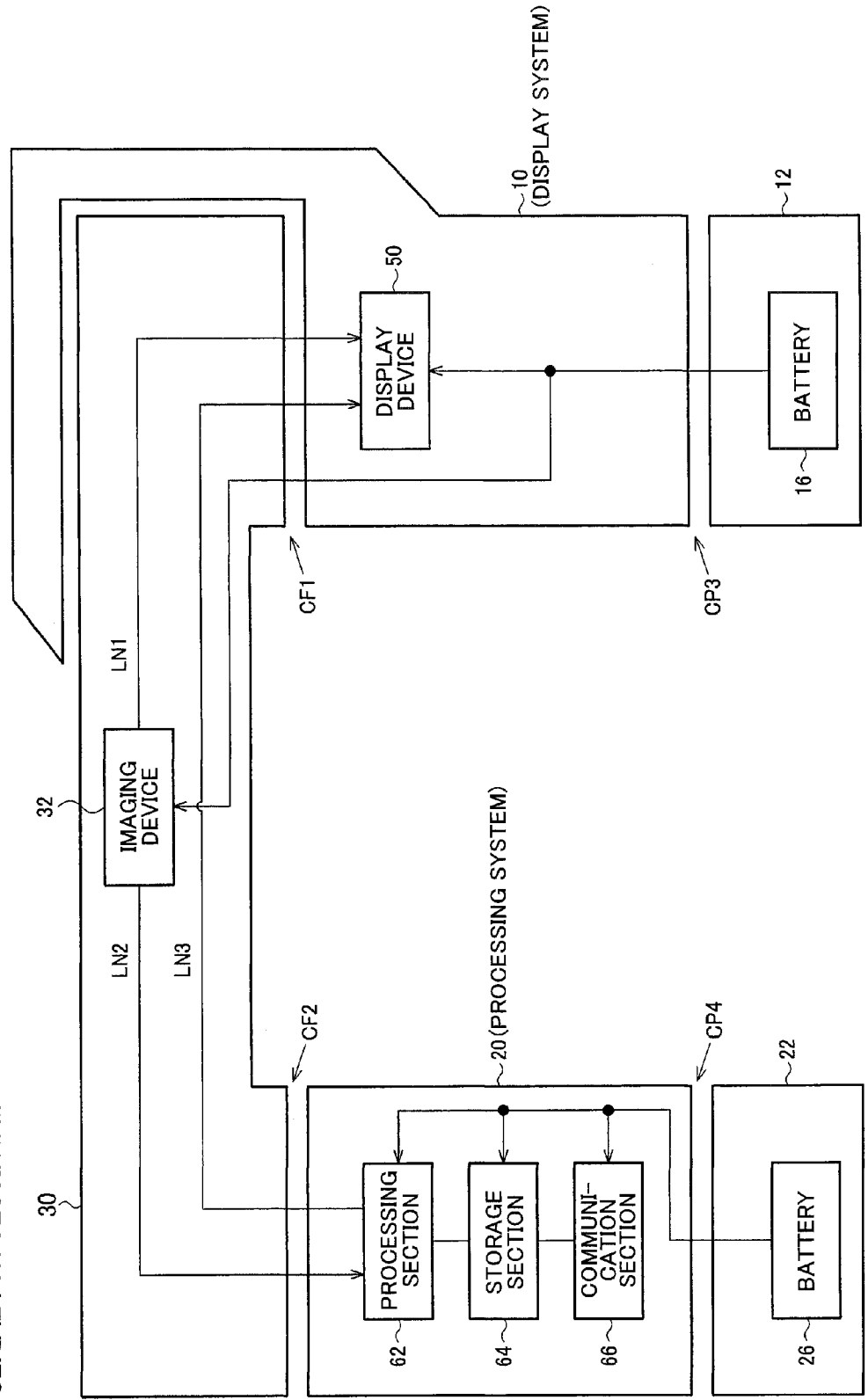

PARALLEL PROCESSING MODE

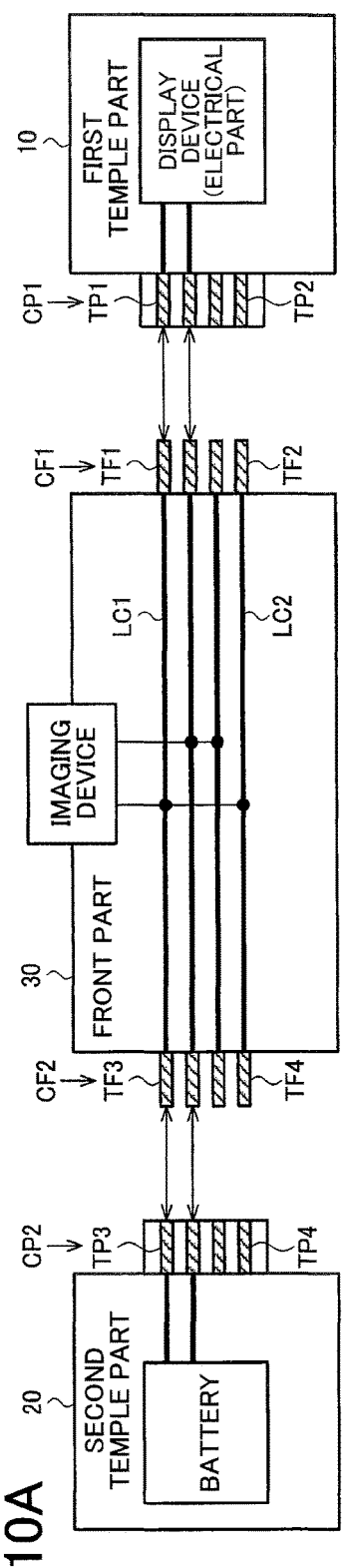
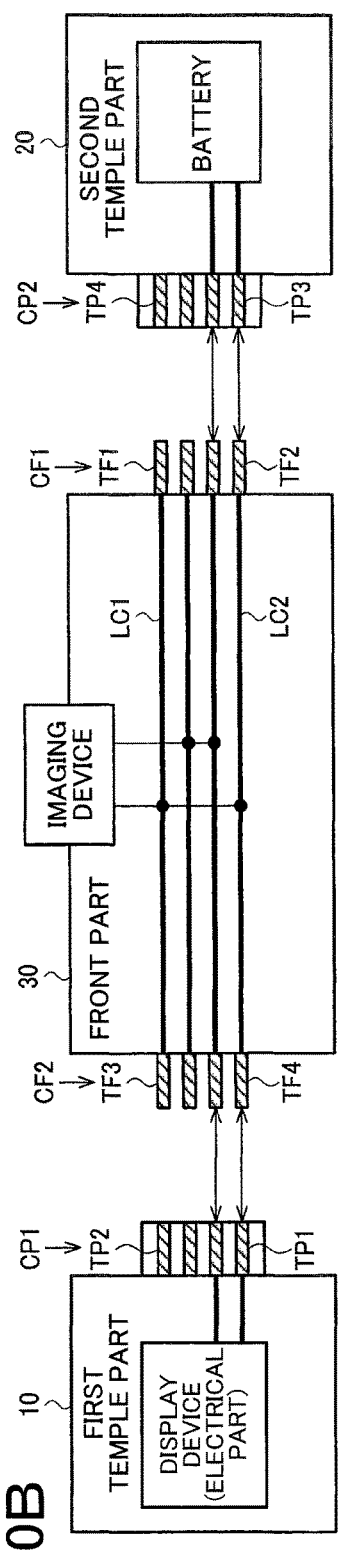
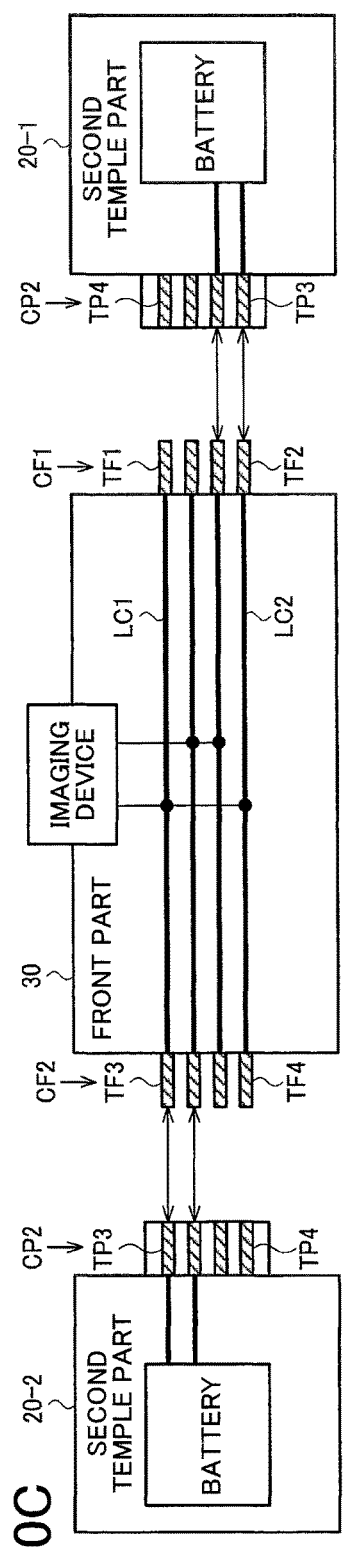
FIG. 10A
FIG. 10B
FIG. 10C

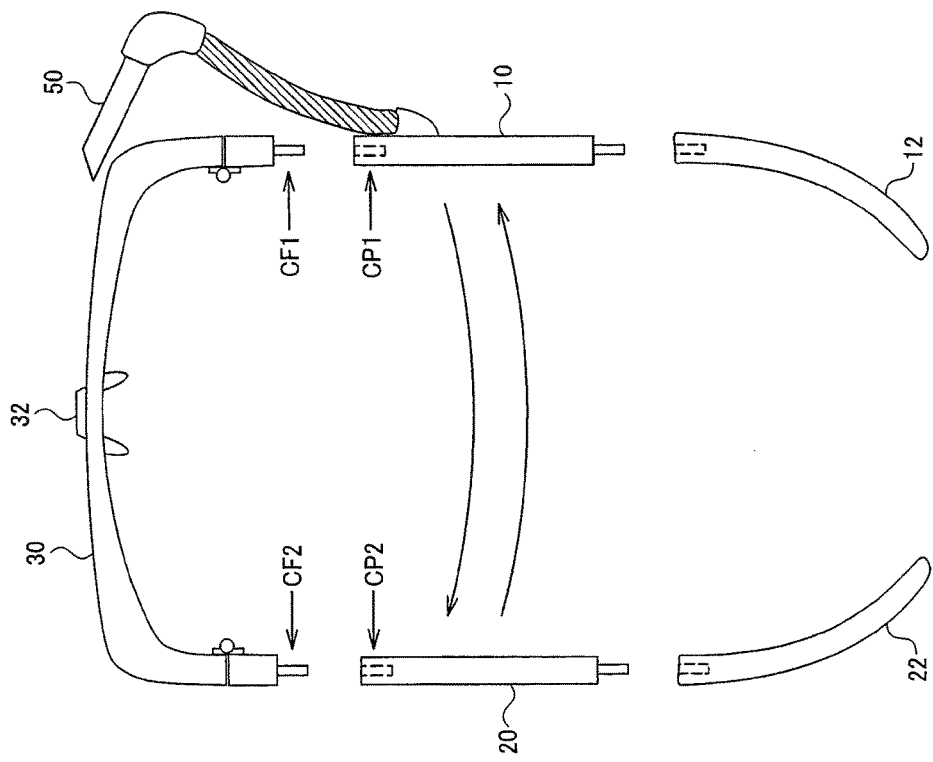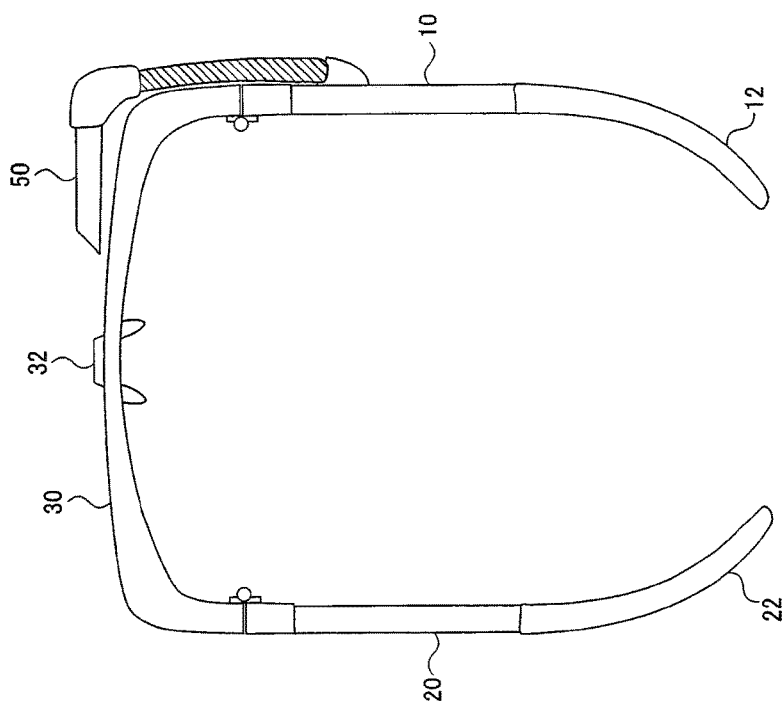

FIG. 21A
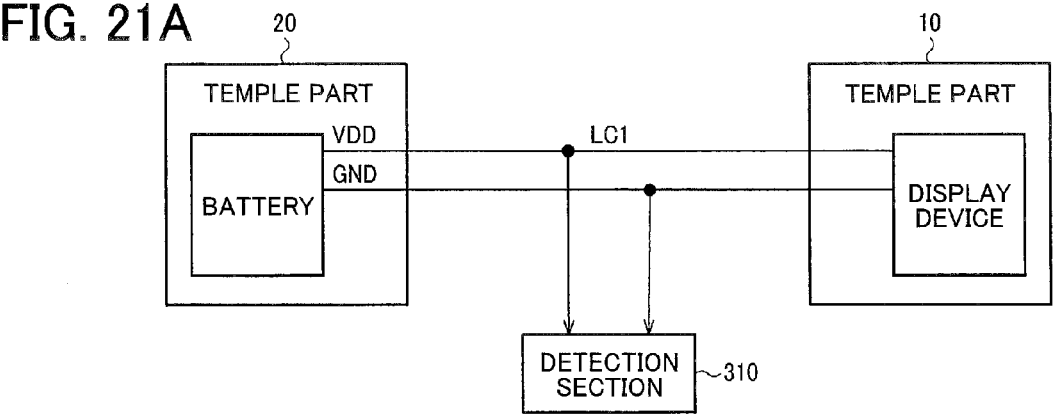
FIG. 21B
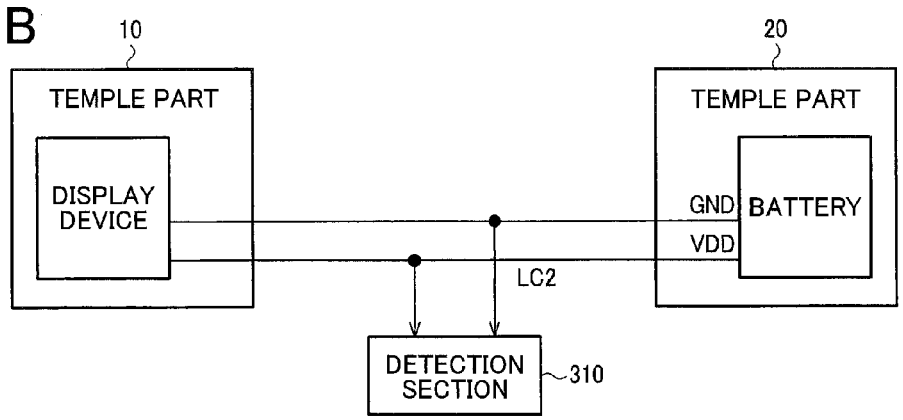
FIG. 21C
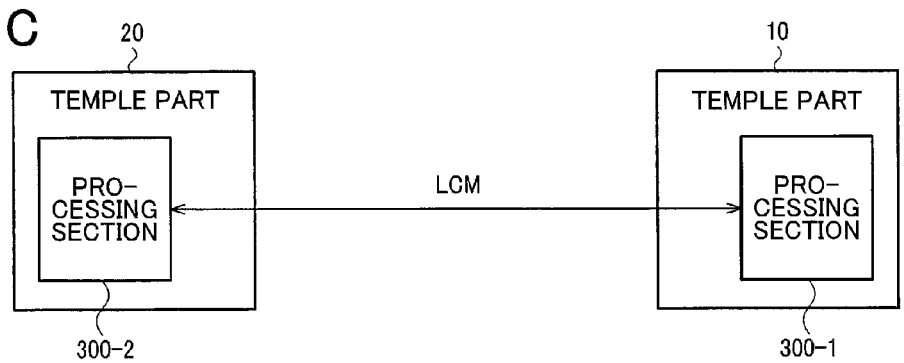
FIG. 21D
| TEMPLE ID | PROCESS |
|---|---|
| ID1 | PP1 |
| ID2 | PP2 |
| ID3 | PP3 |
| ⋮ | ⋮ |

EYEGLASS-TYPE WEARABLE DEVICE AND FRONT PART OF EYGLASS-TYPE WEARABLE DEVICE

CROSS REFERENCE TO RELATED APPLICATION

This application is a continuation of International Patent Application No. PCT/JP2013/075623, having an international filing date of Sep. 24, 2013, which designated the United States, the entirety of which is incorporated herein by reference. Japanese Patent Application No. 2012-234797 filed on Oct. 24, 2012 is also incorporated herein by reference in its entirety.

BACKGROUND

The present invention relates to an eyeglass-type wearable device, a front part of an eyeglass-type wearable device, and the like.

An eyeglass-type wearable device that can be used as a head-mounted display (HMD) and the like has attracted attention in recent years. For example, JP-A-2010-91748 and JP-A-2012-8290 disclose a technique relating to such an eyeglass-type wearable device.

JP-A-2010-91748 discloses a technique that secures a head-mounted display on a head support frame (e.g., eyeglass frame). JP-A-2012-8290 discloses a technique that incorporates a head-mounted display in a dedicated eyeglass frame. It has thus become possible to secure a wearable device on an eyeglass frame, or incorporate a wearable device in an eyeglass frame, along with a reduction in size of a wearable device.

SUMMARY

According to one aspect of the invention, there is provided an eyeglass-type wearable device comprising:

a first temple part that is positioned along one temporal region of a user when the eyeglass-type wearable device is worn by the user;

a second temple part that is positioned along the other temporal region of the user when the eyeglass-type wearable device is worn by the user; and a front part that is positioned in front of a face of the user when the eyeglass-type wearable device is worn by the user, the front part including:

an electrical unit that includes at least an imaging device;

a first connection section to which the first temple part can be connected; and a second connection section to which the second temple part can be connected, at least one of the first temple part and the second temple part including a temple-side electrical unit, the first temple part and the second temple part being a temple part that can be attached to and removed from the first connection section and the second connection section of the front part, image information about an image captured by the imaging device included in the front part being transmitted from the front part to the temple-side electrical unit included in the at least one of the first temple part and the second temple part, the first connection section of the front part being a connection section to which the second temple part can be connected instead of the first temple part, and the second connection section of the front part being a connection section to which the first temple part can be connected instead of the second temple part.

According to another aspect of the invention, there is provided a front part of an eyeglass-type wearable device that is positioned in front of a face of a user when the eyeglass-type wearable device is worn by the user, the front part comprising:

a first connection section to which a first temple part is connected, the first temple part being positioned along one temporal region of the user when the eyeglass-type wearable device is worn by the user;

a second connection section to which a second temple part is connected, the second temple part being positioned along the other temporal region of the user when the eyeglass-type wearable device is worn by the user; and an electrical unit that includes an imaging device, image information about an image captured by the imaging device being output from at least one of the first connection section and the second connection section, the first connection section being a connection section to which the second temple part can be connected instead of the first temple part, and the second connection section being a connection section to which the first temple part can be connected instead of the second temple part.

BRIEF DESCRIPTION OF THE DRAWINGS

FIGS. 2A and 2B are front views of an eyeglass-type wearable device according to one embodiment of the invention.

FIGS. 5A and 5B are views illustrating a serial processing mode and a parallel processing mode.

FIG. 6 is a view illustrating a serial processing mode.

FIGS. 10A to 10C are views illustrating connection lines provided to a front part.

FIGS. 16A and 16B are views illustrating a method that interchanges a right temple part and a left temple part.

FIGS. 21A to 21D are views illustrating a temple part type detection method.

DESCRIPTION OF EXEMPLARY EMBODIMENTS

Figure 1:
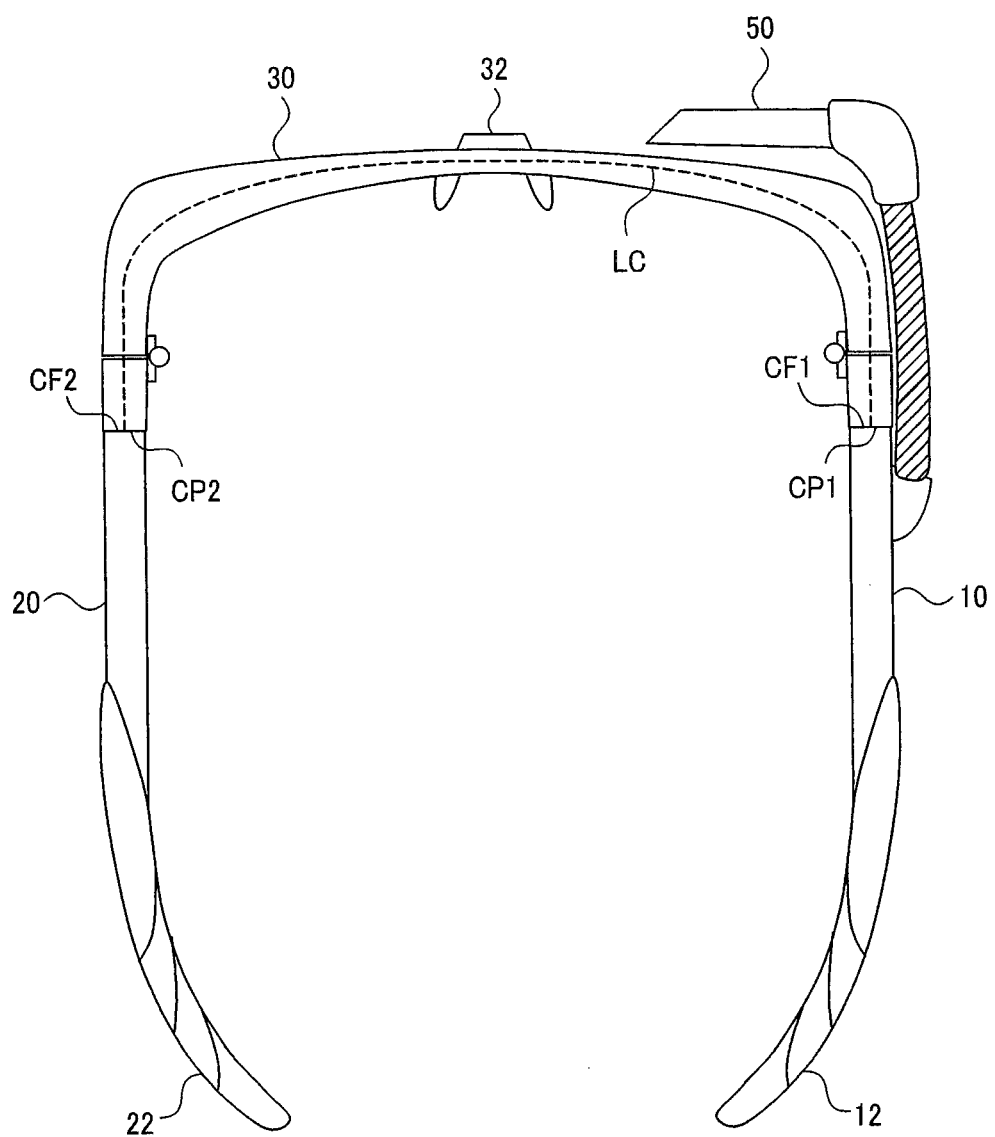
FIG. 1 is a top view of an eyeglass-type wearable device according to one embodiment of the invention.

Several embodiments of the invention may provide an eyeglass-type wearable device that has an imaging function, and can deal with a wide variety of applications, for example, a front part of an eyeglass-type wearable device, and the like.

According to one embodiment of the invention, there is provided an eyeglass-type wearable device comprising:

a first temple part that is positioned along one temporal region of a user when the eyeglass-type wearable device is worn by the user;

a second temple part that is positioned along the other temporal region of the user when the eyeglass-type wearable device is worn by the user; and a front part that is positioned in front of a face of the user when the eyeglass-type wearable device is worn by the user, the front part including:

an electrical unit that includes at least an imaging device;

a first connection section to which the first temple part can be connected; and a second connection section to which the second temple part can be connected, at least one of the first temple part and the second temple part including a temple-side electrical unit, the first temple part and the second temple part being a temple part that can be attached to and removed from the first connection section and the second connection section of the front part, image information about an image captured by the imaging device included in the front part being transmitted from the front part to the temple-side electrical unit included in the at least one of the first temple part and the second temple part.

According to one embodiment of the invention, the eyeglass-type wearable device includes the front part that includes the first connection section and the second connection section, the first temple part, and the second temple part. The front part includes the electrical unit that includes the imaging device, and at least one of the first temple part and the second temple part includes the temple-side electrical unit. The first temple part and the second temple part can be attached to and removed from the first connection section and the second connection section of the front part. The image information about the image captured by the imaging device is transmitted from the front part to the temple-side electrical unit. According to this configuration, it is possible to provide the eyeglass-type wearable device with an imaging function that captures the front side of the user by providing the imaging device to the front part, for example. Since various types of temple parts can be removably connected to the front part, it is possible to deal with a wide variety of applications, for example. For example, it is possible to change or enhance the function of the eyeglass-type wearable device by connecting temple parts including various electrical units to the front part, for example. This makes it possible to provide a novel eyeglass-type wearable device. It is expected that the weight balance and the design are improved by providing most of the electrical units to the first temple part and the second temple part, for example.

In the eyeglass-type wearable device, the first temple part may include a first temple-side electrical unit, the second temple part may include a second temple-side electrical unit, and the image information from the imaging device may be transmitted from the front part to at least one of the first temple-side electrical unit and the second temple-side electrical unit.

According to this configuration, the image information from the imaging device can be transmitted to at least one of the first temple-side electrical unit and the second temple-side electrical unit, and subjected to various types of processing (e.g., display processing or image processing).

In the eyeglass-type wearable device, the electrical unit included in the front part and at least one of the first temple-side electrical unit and the second temple-side electrical unit may be electrically connected when the first temple part and the second temple part are connected to the first connection section and the second connection section of the front part.

According to this configuration, the electrical unit included in the front part and at least one of the first temple-side electrical unit and the second temple-side electrical unit are electrically connected when the first temple part and the second temple part are connected to the first connection section and the second connection section of the front part, and the image information and the like can be transmitted to at least one of the first temple-side electrical unit and the second temple-side electrical unit.

In the eyeglass-type wearable device, the image information from the imaging device may be transmitted from the front part to the second temple-side electrical unit, the second temple-side electrical unit may perform processing on the image information, and information obtained by the processing may be transmitted from the second temple-side electrical unit to the first temple-side electrical unit.

According to this configuration, the second temple-side electrical unit can perform processing on the image information from the imaging device, and information obtained by processing can be transmitted to the first temple-side electrical unit. Therefore, information processed by one of the temple parts can be used for the other temple part, and it is possible to implement a novel eyeglass-type wearable device.

In the eyeglass-type wearable device, the first temple-side electrical unit may include a display device, and the image information from the imaging device may be transmitted from the front part to the second temple-side electrical unit, the second temple-side electrical unit may perform image processing on the image information, and the image information subjected to the image processing may be transmitted from the second temple-side electrical unit to the first temple-side electrical unit, and displayed on the display device included in the first temple-side electrical unit.

According to this configuration, the second temple-side electrical unit can perform image processing on the image information from the imaging device, and the image information subjected to image processing can be transmitted to the first temple-side electrical unit, and displayed on the display device.

In the eyeglass-type wearable device, the image information from the imaging device may be transmitted from the front part to the first temple-side electrical unit and the second temple-side electrical unit.

According to this configuration, the first temple-side electrical unit and the second temple-side electrical unit can perform various types of processing on the image information from the imaging device.

In the eyeglass-type wearable device, the first temple-side electrical unit may include a display device, the image information from the imaging device may be transmitted from the front part to the first temple-side electrical unit, and displayed on the display device included in the first temple-side electrical unit, and the image information from the imaging device may be transmitted from the front part to the second temple-side electrical unit, and the second temple-side electrical unit may perform at least one of image processing, storage processing, and external communication processing on the image information.

According to this configuration, the image information from the imaging device can be transmitted to the first temple-side electrical unit, and displayed on the display device, and can also be transmitted to the second temple-side electrical unit, and subjected to at least one of image processing, storage processing, and external communication processing.

In the eyeglass-type wearable device, the temple-side electrical unit included in the at least one of the first temple part and the second temple part may include a display device, and the image information from the imaging device may be transmitted from the front part to the temple-side electrical unit included in the at least one of the first temple part and the second temple part, and displayed on the display device included in the temple-side electrical unit included in the at least one of the first temple part and the second temple part.

According to this configuration, the image information from the imaging device can be transmitted to at least one of the first temple-side electrical unit and the second temple-side electrical unit, and displayed on the display device.

In the eyeglass-type wearable device, the display device may include:

a display section;

an eyepiece optical system that allows the user to observe an image displayed on the display section as a virtual image; and a support section that supports an eye piece of the eyepiece optical system in front of the front part.

This makes it possible to provide an eyeglass-type wearable device that utilizes the display device included in at least one temple-side electrical unit, and allows the user to observe an image displayed on the display section as a virtual image.

In the eyeglass-type wearable device, the temple-side electrical unit included in the at least one of the first temple part and the second temple part may include a battery, and power supplied from the battery may be supplied from the temple-side electrical unit included in the at least one of the first temple part and the second temple part to the imaging device included in the front part.

This makes it possible to supply power to the electrical part of the eyeglass-type wearable device by connecting the temple part provided with the battery to the front part.

In the eyeglass-type wearable device, the battery may be provided to a temple tip part of the at least one of the first temple part and the second temple part.

According to this configuration, it is possible to supply power to the electrical part of the electrical unit using the battery, and improve the weight balance, for example.

In the eyeglass-type wearable device, the at least one of the first temple part and the second temple part may include:

the temple tip part that is provided with the battery; and a connection section to which the temple tip part is removably connected.

When the connection section to which the temple tip part is removably connected is provided, the temple tip part provided with the battery can be attached to and removed from the temple part, and convenience to the user can be improved.

In the eyeglass-type wearable device, the first connection section of the front part may be a connection section to which the second temple part can be connected instead of the first temple part, and the second connection section of the front part may be a connection section to which the first temple part can be connected instead of the second temple part.

According to this configuration, since the first temple part and the second temple part connected to the front part can be interchanged, it is possible to deal with a wide variety of applications.

In the eyeglass-type wearable device, the first temple part may be connected to the first connection section in a state in which a first side faces in a first direction, and a second side opposite to the first side faces in a second direction that is opposite to the first direction, and connected to the second connection section in a state in which the first side faces in the second direction, and the second side faces in the first direction, and the second temple part may be connected to the second connection section in a state in which a first side faces in the second direction, and a second side opposite to the first side faces in the first direction, and connected to the first connection section in a state in which the first side faces in the first direction, and the second side faces in the second direction.

According to this configuration, the first temple part and the second temple part can be interchanged by rotating the first temple part and the second temple by 180°, and connecting the first temple part and the second temple to the front part, for example.

In the eyeglass-type wearable device, the first connection section may include a first terminal and a second terminal, the second connection section may include a third terminal and a fourth terminal, the first temple part may include:

a first temple-side terminal that is connected to the first terminal of the first connection section when the first temple part is connected to the first connection section, and is connected to the fourth terminal of the second connection section when the first temple part is connected to the second connection section; and a second temple-side terminal that is connected to the second terminal of the first connection section when the first temple part is connected to the first connection section, and is connected to the third terminal of the second connection section when the first temple part is connected to the second connection section, and the second temple part may include:

a third temple-side terminal that is connected to the third terminal of the second connection section when the second temple part is connected to the second connection section, and is connected to the second terminal of the first connection section when the second temple part is connected to the first connection section; and a fourth temple-side terminal that is connected to the fourth terminal of the second connection section when the second temple part is connected to the second connection section, and is connected to the first terminal of the first connection section when the second temple part is connected to the first connection section.

It is possible to interchange the first temple part and the second temple part by providing the first to fourth terminals and the first to fourth temple-side terminals, and connecting these terminals.

In the eyeglass-type wearable device, when temple parts that are identical in type have been respectively connected to the first connection section and the second connection section, the front part may electrically disconnect electrical units respectively included in the temple parts that are identical in type.

This makes it possible to effectively prevent a problem that occurs when temple parts that are identical in type are connected to the first connection section and the second connection section of the front part.

According to another embodiment of the invention, there is provided a front part of an eyeglass-type wearable device that is positioned in front of a face of a user when the eyeglass-type wearable device is worn by the user, the front part comprising:

a first connection section to which a first temple part is connected, the first temple part being positioned along one temporal region of the user when the eyeglass-type wearable device is worn by the user;

a second connection section to which a second temple part is connected, the second temple part being positioned along the other temporal region of the user when the eyeglass-type wearable device is worn by the user; and an electrical unit that includes an imaging device, image information about an image captured by the imaging device being output from at least one of the first connection section and the second connection section.

The front part of an eyeglass-type wearable device includes the first connection section and the second connection section to which the first temple part and the second temple part are connected, and the electrical unit that includes the imaging device. The image information about the image captured by the imaging device is output from at least one of the first connection section and the second connection section when the first temple part and the second temple part are connected to the front part. According to this configuration, it is possible to provide the eyeglass-type wearable device with an imaging function that captures the front side of the user by providing the imaging device to the front part, for example. It is also possible to deal with a wide variety of applications by appropriately connecting the first temple part and the second temple part to the front part, for example.

The front part may further comprise:

a connection line that electrically connects a first temple-side electrical unit provided to the first temple part and a second temple-side electrical unit provided to the second temple part when the first temple part and the second temple part are connected to the first connection section and the second connection section of the front part.

Since a signal and power can be exchanged between the first temple-side electrical unit and the second temple-side electrical unit, and between the first temple-side electrical unit or the second temple-side electrical unit and the imaging device, through the connection line provided in the front part, it is possible to easily deal with a wide variety of applications, for example.

Exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Eyeglass-Type Wearable Device

Figure 3A:
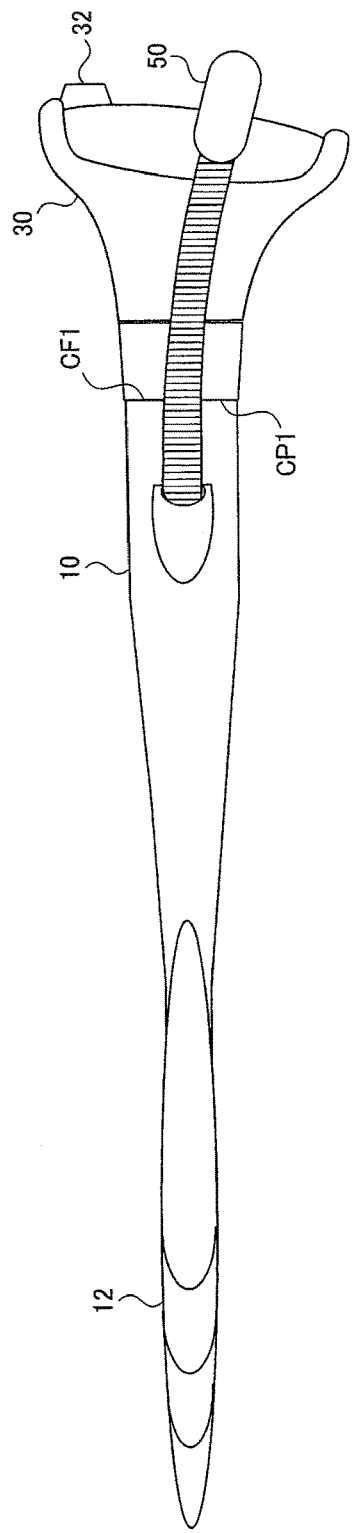
FIGS. 3A and 3B are right side views of an eyeglass-type wearable device according to one embodiment of the invention.
Figure 3B:
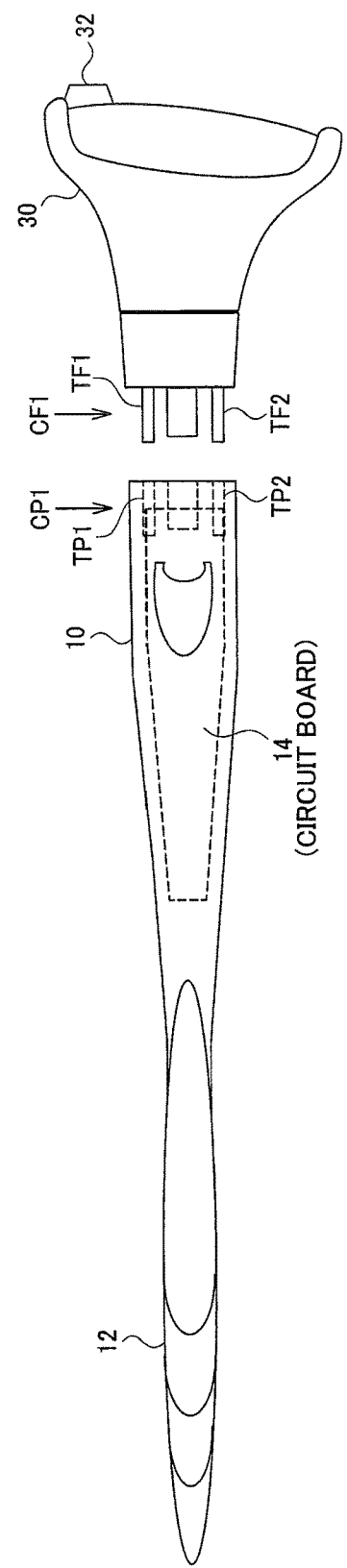
Figure 4:
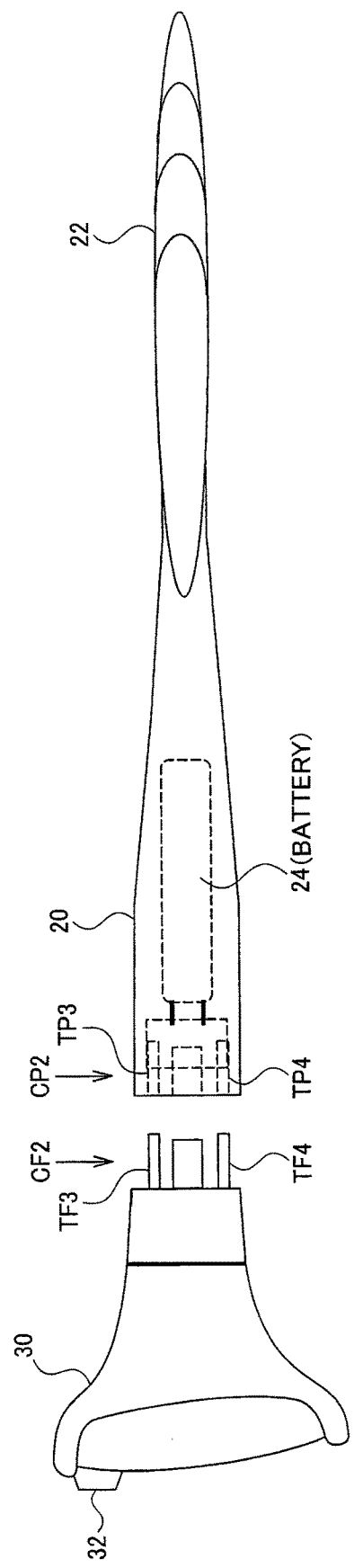
FIG. 4 is a left side view of an eyeglass-type wearable device according to one embodiment of the invention.

FIGS. 1 to 4 illustrate a configuration example of an eyeglass-type wearable device according to one embodiment of the invention. FIG. 1 is a top view of the eyeglass-type wearable device. FIGS. 2A and 2B are front views of the eyeglass-type wearable device. FIGS. 3A and 3B are right side views of the eyeglass-type wearable device, and FIG. 4 is a left side view of the eyeglass-type wearable device.

The eyeglass-type wearable device (electronic eyeglass frame) includes a first temple part 10, a second temple part 20, and a front part 30. The eyeglass-type wearable device is a device that has an eyeglass-type frame, and allows the user to wear the device.

For example, the eyeglass-type wearable device illustrated in FIG. 1 includes an imaging device 32, and functions as a head-mounted imaging device. The eyeglass-type wearable device illustrated in FIG. 1 includes a display device 50, and also functions as a head-mounted display (HMD).

More specifically, the imaging device 32 (image sensor) is provided to the front part 30 so that the front side of the user can be captured, for example. A camera viewfinder function and the like can be implemented by displaying the captured image on the display device 50. A wearable device that functions as a live camera can be implemented by always capturing an image using the imaging device 32. Note that the eyeglass-type wearable device according to one embodiment of the invention may have a configuration in which the display device is not provided, or may have a configuration in which a device other than the imaging device and the display device can be mounted in a wearable manner.

The first temple part 10 and the second temple part 20 correspond to the temples of eyeglasses. More specifically, the first temple part 10 is positioned along one temporal region of the user when the eyeglass-type wearable device is worn by the user. The second temple part 20 is positioned along the other temporal region of the user when the eyeglass-type wearable device is worn by the user. In the example illustrated in FIG. 1, the first temple part 10 is positioned along the right temporal region (one temporal region in a broad sense) of the user when the eyeglass-type wearable device is worn by the user, and the second temple part 20 is positioned along the left temporal region (the other temporal region in a broad sense) of the user when the eyeglass-type wearable device is worn by the user. Specifically, the first temple part 10 is positioned on the right side of the head of the user, and the second temple part 20 is positioned on the left side of the head of the user. Note that the eyeglass-type wearable device is configured so that the right temple part and the left temple part can be interchanged (described later). For example, when the right temple part and the left temple part are interchanged as compared with the state illustrated in FIG. 1, the first temple part 10 is positioned along the left temporal region, and the second temple part 20 is positioned along the right temporal region.

The front part 30 corresponds to the rim and the bridge of eyeglasses. The front part 30 is positioned in front of (on the front side of) the face of the user when the eyeglass-type wearable device is worn by the user. For example, when the eyeglass-type wearable device functions as a see-through head-mounted display (HMD), the areas of the front part 30 corresponding to the left eye and the right eye are formed in the shape of a rim such as that of eyeglasses, and the user can see an image in which the display image displayed on the display device 50 is superimposed on the external field of view (external sight).

As illustrated in FIG. 2A, the imaging device 32 is provided to the front part 30. The imaging device 32 includes an image sensor (e.g., CCD or CMOS sensor). The imaging device 32 may include an optical system (e.g., lens) for capturing an image using the image sensor. The optical axis of the imaging device 32 is set to a direction orthogonal (approximately orthogonal) to the front side of the front part 30. The optical axis of the imaging device 32 extends approximately along the direction in which the user faces. Therefore, the user can capture the state in the direction in which the user faces even if the user does not hold a camera with his hand.

In FIG. 2A, one imaging device 32 (image sensor) is provided to the center of the front part 30. This makes it possible to capture an image (picture) within the front field of view of the user (wearer). Note that the imaging device 32 need not necessarily be provided at the position illustrated in FIG. 2A. As illustrated in FIG. 2B, an imaging device 32-1 may be provided to be situated around the right eye, and an imaging device 32-2 may be provided to be situated around the left eye (i.e., two imaging devices may be provided in total), for example. This makes it possible to capture a stereoscopic image, and implement various processes that utilize parallax information. Examples of the processes that utilize the parallax information include a process that calculates distance information from a parallax image, and the like.

In one embodiment of the invention, the front part 30 includes an electrical unit that includes at least the imaging device 32, a first connection section CF1 to which the first temple part 10 can be connected, and a second connection section CF2 to which the second temple part 20 can be connected (see FIGS. 1 to 4). For example, the first connection section CF1 is provided at the right end of the front part 30 when viewed from the user, and the second connection section CF2 is provided at the left end of the front part 30 when viewed from the user. The front part 30 may include an electrical part other than the imaging device 32 as the electrical unit. For example, the front part 30 may include an electrical part such as a circuit board on which the imaging device 32 or the like is mounted, or a sensor (direction sensor or range sensor).

In one embodiment of the invention, at least one of the first temple part 10 and the second temple part 20 includes a temple-side electrical unit. More specifically, at least one of the first temple part 10 and the second temple part 20 includes at least one of a display device and a battery as the temple-side electrical unit. The electrical unit is implemented by an electrical part such as a circuit board or a display device, or a power supply component such as a battery, for example.

As illustrated in FIGS. 3A and 3B, electrical parts such as the display device 50 and a circuit board 14 are provided to the first temple part 10 as the electrical unit. The display device 50 is an eyepiece display device described later, for example. Circuit devices (elements) such as an integrated circuit (IC) and an active device (e.g., resistor and capacitor) are mounted on the circuit board 14. The IC may be a driver IC for the display device 50, a sensor IC, a wireless IC, and the like.

As illustrated in FIG. 4, a battery 24 (secondary battery or primary battery) is provided to the second temple part 20 as the electrical unit. Note that electrical parts such as a display device and a circuit board may be provided to the second temple part 20 as the electrical unit.

Figure 12A:
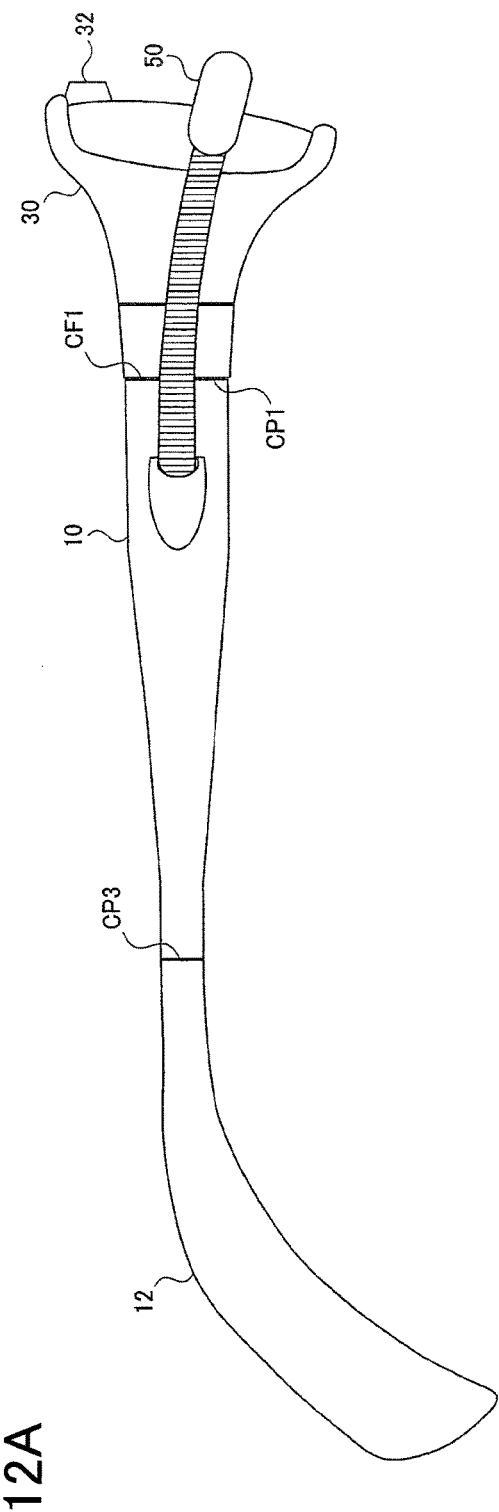
FIGS. 12A and 12B are views illustrating a method that provides a battery to a temple tip part of a temple part.
Figure 12B:
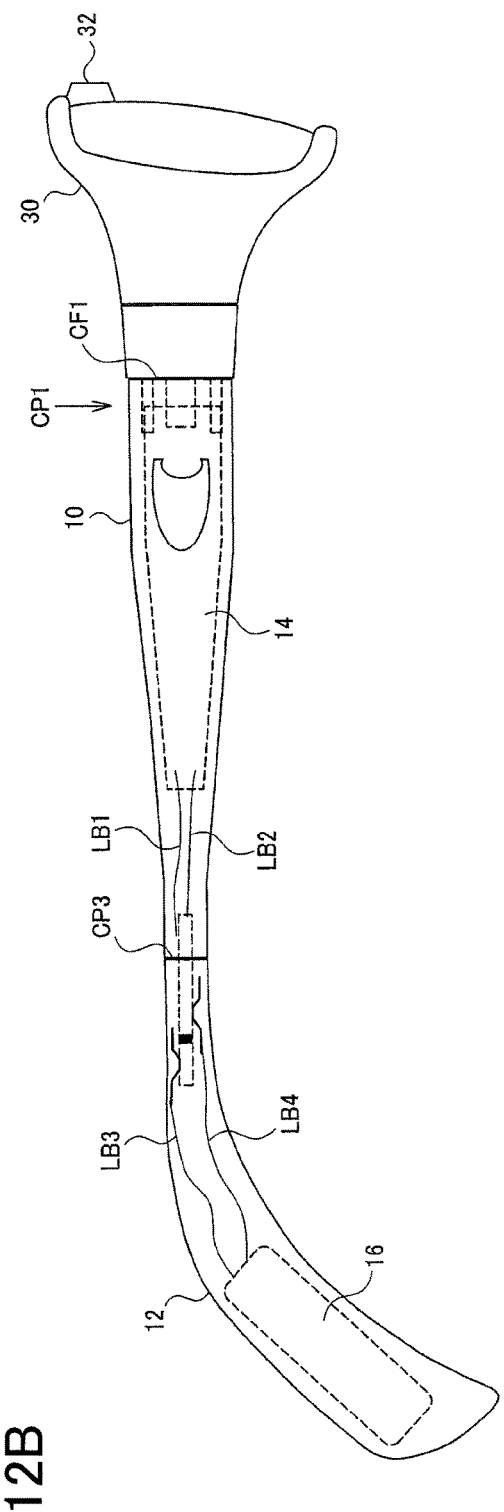

As illustrated in FIG. 12B and the like, at least one of the first temple part 10 and the second temple part 20 may include a battery as the electrical unit, and the battery may be provided to a temple tip part (12, 22) of the at least one of the first temple part 10 and the second temple part 20. More specifically, at least one of the first temple part 10 and the second temple part 20 may include the temple tip part in which a battery is provided, and a connection section (CP3) to which the temple tip part is removably connected.

In one embodiment of the invention, the first temple part 10 and the second temple part 20 can be attached to and removed from the first connection section CF1 and the second connection section CF2 of the front part 30. Specifically, the first temple part 10 and the second temple part 20 can be removably connected to the first connection section CF1 and the second connection section CF2, respectively.

For example, the first temple part 10 and the second temple part 20 include a first connection section CP1 and a second connection section CP2, respectively. The first connection section CP1 and the second connection section CP2 can be connected to the first connection section CF1 and the second connection section CF2 of the front part 30, respectively. For example, the first connection section CF1 is a connection section to which the second temple part 20 can be connected instead of the first temple part 10 (described later). The second connection section CF2 is a connection section to which the first temple part 10 can be connected instead of the second temple part 20. Specifically, the first connection section CF1 and the second connection section CF2 are configured so that various temple parts can be removably connected thereto.

More specifically, the first connection section CF1 includes a first terminal TF1 and a second terminal TF2 (see FIG. 3B), and the second connection section CF2 includes a third terminal TF3 and a fourth terminal TF4 (see FIG. 4). The first connection section CP1 includes a first temple-side terminal TP1 and a second temple-side terminal TP2 (see FIG. 3B), and the second connection section CP2 includes a third temple-side terminal TP3 and a fourth temple-side terminal TP4 (see FIG. 4). When the first temple part 10 and the second temple part 20 are connected to the front part 30, the first terminal TF1 and the second terminal TF2 come in contact with the first temple-side terminal TP1 and the second temple-side terminal TP2, respectively, and the third terminal TF3 and the fourth terminal TF4 come in contact with the third temple-side terminal TP3 and the fourth temple-side terminal TP4, respectively.

In one embodiment of the invention, the image information about the image (picture) captured by the imaging device 32 provided to the front part 30 is transmitted from the front part 30 to at least one of a temple-side electrical unit provided to the first temple part 10 and a temple-side electrical unit provided to the second temple part 20.

For example, the electrical unit (e.g., imaging device 32) provided to the front part 30 is electrically connected to the temple-side electrical unit (first temple-side electrical unit) provided to the first temple part 10 and the temple-side electrical unit (first temple-side electrical unit) provided to the second temple part 20 when the first temple part 10 and the second temple part 20 are connected to the first connection section CF1 and the second connection section CF2 of the front part 30. As illustrated in FIG. 1, a connection line LC is provided to the front part 30. The connection line LC electrically connects the electrical unit (e.g., imaging device 32) provided to the front part 30 to the temple-side electrical unit (e.g., display device, circuit board, battery, processing section, storage section, or communication section) provided to the first temple part 10 and the temple-side electrical unit (e.g., display device, circuit board, battery, processing section, storage section, or communication section) provided to the second temple part 20 when the first temple part 10 and the second temple part 20 are connected to the front part 30. The connection line LC also electrically connects the temple-side electrical unit provided to the first temple part 10 and the temple-side electrical unit provided to the second temple part 20.

It is possible to implement a serial processing mode and a parallel processing mode illustrated in FIGS. 5A and 5B (described later) by electrically connecting the imaging device 32 provided to the front part 30 to the temple-side electrical units when the first temple part 10 and the second temple part 20 are connected to the front part 30.

In the serial processing mode, the image (picture) information from the imaging device 32 is transmitted from the front part 30 to the second temple-side electrical unit (i.e., the electrical unit provided to the second temple part 20), and the second temple-side electrical unit performs processing (e.g., image processing) on the image information, for example. Information obtained by processing is transmitted from the second temple-side electrical unit to the first temple-side electrical unit (i.e., the electrical unit provided to the first temple part 10). In the parallel processing mode, the image (picture) information from the imaging device 32 is transmitted from the front part 30 to the first temple-side electrical unit and the second temple-side electrical unit.

At least one of the temple-side electrical unit provided to the first temple part 10 and the temple-side electrical unit provided to the second temple part 20 includes the display device 50. For example, the electrical unit provided to the first temple part 10 includes the display device 50 in FIG. 1. The image information from the imaging device 32 is transmitted from the front part 30 to at least one of the temple-side electrical unit provided to the first temple part 10 and the temple-side electrical unit provided to the second temple part 20, and displayed on the display device 50 provided to at least one of the temple-side electrical unit provided to the first temple part 10 and the temple-side electrical unit provided to the second temple part 20. For example, the image captured by the imaging device 32 is displayed on the display device 50 provided to the first temple part 10 in FIG. 1. This makes it possible to provide a content while synchronizing the display device 50 and the imaging device 32. For example, it is possible to perform an image recognition process on the image captured by the imaging device 32, and display the image based on the results of the image recognition process on the display device 50. For example, a signboard or the like written in a foreign language may be captured using the imaging device 32, and subjected to the image recognition process, and the translation results obtained by the image recognition process may be displayed on the display device 50.

According to one embodiment of the invention, it possible to capture the front side of the user by providing an imaging device (image sensor) to the front part of the eyeglass-type wearable device that is worn on the head of the user. The image (picture) captured by the imaging device can be output from both the connection section provided to the right side of the front part and the connection section provided to the left side of the front part. Therefore, each of the temple parts connected to the front part can receive the image information (image signal or picture signal) from the imaging device, and perform various types of processing (e.g., display processing or image processing) on the received information.

Since the connection line that connects the temple parts, and connects the temple parts and the imaging device is provided to the front part, it is possible to process the captured image using the processing-system temple part, and display the processing results using the display-system temple part, for example.

The right temple part and the left temple part can be interchanged, and it is possible to connect the display-system temple part to the right side and the left side of the front part, or use only the processing-system temple part without using the display-system temple part. Since power can be supplied to the imaging device from the battery provided to the temple part, it is unnecessary to provide a battery to the front part. This makes it possible to reduce the weight of the front part.

According to one embodiment of the invention, the temple part provided with the electrical unit can be attached to and removed from the connection section of the front part, and the user can easily connect the desired temple part, or replace the temple part with the desired temple part, corresponding to the application. For example, the user can use the eyeglass-type wearable device as normal eyeglasses when the user does not utilize the wearable device, or use the eyeglass-type wearable device for a wide variety of applications by replacing the temple part with a temple part having a different function.

For example, a known eyeglass-type wearable device has a configuration in which only one temple part performs processing, or the right temple part and the left temple part cannot perform different types of processing. Moreover, information processed by one of the temple parts cannot be used for the other temple part.

According to one embodiment of the invention, since the image information (image signal) is transmitted from the front part to each of the right temple part and the left temple part, the right temple part and the left temple part can independently perform necessary processing. Since the right temple part and the left temple part are electrically connected through the front part, the right temple part and the left temple part can perform processing in cooperation. It is also possible to deal with a wide variety of applications, and implement various types of processing by interchanging the right temple part and the left temple part, or appropriately combining the desired temple parts. Therefore, it is possible to provide an eyeglass-type wearable device that has an imaging function, and can deal with a wide variety of applications, for example.

The front part of eyeglasses is normally required to have excellent design. However, when a number of electrical units are provided to the front part, the size of the front part increases, and the design is impaired. When a heavy electrical unit is provided to the front part, the weight balance deteriorates, and convenience is impaired. For example, when displaying the see-through image illustrated in FIG.

13B (described later), it is desirable to increase the time in which the user can comfortably use the eyeglass-type wearable device as much as possible. However, it is difficult to meet such a demand when a heavy electrical unit is provided to the front part.

According to one embodiment of the invention, since the temple part is designed to be removable from the front part, it is possible to use a front part having excellent design, and meet the user demand for excellent design. It is also possible to use the eyeglass-type wearable device as normal eyeglasses by replacing the temple part with a normal eyeglass temple part that is not provided with an electrical unit (see FIG. 14C).

According to one embodiment of the invention, since most of the electrical units are provided to the temple part, and it suffices to provide only the imaging device having a light weight to the front part, it is possible to reduce the weight and the size of the front part. This makes it possible to improve the weight balance of the eyeglass-type wearable device, and provide an eyeglass-type wearable device that displays the see-through image illustrated in FIG. 13B, and can be comfortably used for a long time, for example. In this case, the weight balance can be further improved by providing a battery in the temple tip part, or dividing the electrical unit between the right temple part and the left temple part.

As illustrated in FIGS. 1 to 4, the first temple part 10 is provided with the display device 50 that allows the user to closely observe the display image (display picture) as a virtual image, for example. On the other hand, the battery 24, and an electrical part (electronic part) having a different function (e.g., processing circuit, radio communication device, TV tuner, sensor, and memory) can be provided to the second temple part 20, for example. Therefore, it is possible to display the image captured by the imaging device 32 on the display device 50, process the captured image using a processing circuit, store the captured image in a storage section, or transmit the captured image to the outside using a radio communication device, for example.

Since the connection line LC is provided to the front part 30 (see FIG. 1), it is possible to electrically connect the first temple part 10, the second temple part 20, and the imaging device 32 using the connection line LC, and the image information and the image information subjected to processing can be exchanged between the first temple part 10, the second temple part 20, and the imaging device 32. For example, power supplied from the battery 24 provided to the second temple part 20 (see FIG. 4) can be supplied to the imaging device 32 provided to the front part 30 and the display device 50 provided to the first temple part 10 to drive the imaging device 32 and the display device 50, for example.

According to one embodiment of the invention, the weight balance of the eyeglass-type wearable device can be improved by dividing the electrical parts (electrical system) between the first temple part 10 and the second temple part 20 (right temple part and left temple part). Since the first temple part 10 and the second temple part 20 can be attached to and removed from the front part 30, it is possible to utilize various devices corresponding to the application, and deal with a wide variety of applications.

Another embodiment of the invention implements a front part of an eyeglass-type wearable device that is positioned in front of the face of the user when the eyeglass-type wearable device is worn by the user. In this case, the front part includes a first connection section for connecting a first temple part that is positioned along one temporal region of the user when the eyeglass-type wearable device is worn by the user, a second connection section for connecting a second temple part that is positioned along the other temporal region of the user when the eyeglass-type wearable device is worn by the user, and an electrical unit that includes an imaging device. Information about an image captured by the imaging device is output from at least one of the first connection section and the second connection section. The front part includes a connection line that electrically connects a first temple-side electrical unit provided to the first temple part and a second temple-side electrical unit provided to the second temple part when the first temple part and the second temple part are connected to the front part.

This configuration makes it possible to provide an eyeglass-type wearable device with an imaging function, and provide a temple part of an eyeglass-type wearable device that can deal with a wide variety of applications, and perform various types of processing.

2. Serial Processing Mode and Parallel Processing Mode

The serial processing mode and the parallel processing mode according to one embodiment of the invention are described below with reference to FIGS. 5A to 7.

The eyeglass-type wearable device according to one embodiment of the invention can implement the serial processing mode and the parallel processing mode as illustrated in FIGS. 5A and 5B. The eyeglass-type wearable device can be operated while switching the mode, as required.

In the serial processing mode illustrated in FIG. 5A, information (signal) is transmitted from the front part 30 to the second temple part 20, and the electrical unit provided to the second temple part 20 performs processing (e.g., image processing) on the information. The processing results are transmitted to the first temple part 10 through the front part 30, for example, and the first temple part 10 performs processing (e.g., image display processing).

When the first temple-side electrical unit (i.e., the electrical unit provided to the first temple part 10) includes the display device 50, the image information (image signal) from the imaging device 32 is transmitted from the front part 30 to the second temple-side electrical unit (i.e., the electrical unit provided to the second temple part 20), and the second temple-side electrical unit performs processing image processing on the image information. In FIG. 5A, a processing section 62 included in the second temple-side electrical unit performs image processing. Examples of image processing include image filter processing, high-quality processing, and the like. The image information subjected to image processing is transmitted to the first temple-side electrical unit, and displayed on the display device 50 included in the first temple-side electrical unit.

In the parallel processing mode illustrated in FIG. 5B, the first temple part 10 and the second temple part 20 perform processing in parallel using information (signal) output from the front part 30 to the first temple part 10 and the second temple part 20.

When the first temple-side electrical unit includes the display device 50, the image information from the imaging device 32 is transmitted from the front part 30 to the first temple-side electrical unit, and displayed on the display device 50 included in the first temple-side electrical unit. The image information from the imaging device 32 is transmitted from the front part 30 to the second temple-side electrical unit, and the second temple-side electrical unit performs at least one of image processing, storage processing, and external communication processing (i.e., processing for communicating with an external device) on the image information. More specifically, when the second temple part 20 includes the processing section 62, a storage section 64, and a communication section 66 (see FIG. 5B), the processing section 62 performs image processing, the storage section 64 performs image storage processing, and the communication section 66 performs external communication processing.

FIG. 6 is a view illustrating the serial processing mode in detail. In FIG. 6, connection lines LN1, LN2, and LN3 are provided to the front part 30 (front frame) that includes the imaging device 32. The connection line LN1 is a signal line that electrically connects the electrical unit (e.g., imaging device) provided to the front part 30 and the electrical unit (e.g., display device) provided to the first temple part 10. The connection line LN2 is a signal line that electrically connects the electrical unit provided to the front part 30 and the electrical unit (e.g., processing section, storage section, and communication section) provided to the second temple part 20. The connection line LN3 is a signal line that electrically connects the electrical unit provided to the first temple part 10 and the electrical unit provided to the second temple part 20.

The connection line LN1 is connected to the terminal of the first connection section CF1 of the front part 30, and a signal from the electrical unit (e.g., imaging device) provided to the front part 30 can be transmitted to the first temple part 10 through the connection line LN1. The connection line LN2 is connected to the terminal of the second connection section CF2 of the front part 30, and a signal from the electrical unit provided to the front part 30 can be transmitted to the second temple part 20 through the connection line LN2. The connection line LN3 is connected to the terminal of the first connection section CF1 and the terminal of the second connection section CF2 of the front part 30, and a signal from the second temple part 20 can be transmitted to the first temple part 10 through the connection line LN3.

The first temple part 10 and the second temple part 20 receive a signal from the front part 30, and perform given processing. For example, the first temple part 10 (right temple part) may perform processing for displaying the captured image, and the second temple part 20 (left temple part) may perform image processing, storage processing, external communication processing, and the like on the captured image.

More specifically, the image signal from the imaging device 32 is input to the processing section 62 provided to the second temple part 20 through the connection line LN2 provided to the front part 30, and the processing section 62 performs image processing. The image signal from the imaging device 32 or information about the image signal subjected to image processing is stored in the storage section 64, or transmitted to an external device through the communication section 66.

The image signal subjected to image processing performed by the processing section 62 is input to the display device 50 provided to the first temple part 10 through the connection line LN3 provided to the front part 30. The image signal from the imaging device 32 that is not subjected to image processing can also be input to the display device 50 through the connection line LN1. The display device 50 displays the image represented by the image signal subjected to image processing, or the image signal that is not subjected to image processing. The serial processing mode illustrated in FIG. 5A is thus implemented.

A battery 16 and a battery 26 are respectively provided to the first temple part 10 and the second temple part 20. Specifically, the battery 16 and the battery 26 are respectively provided to the temple tip part 12 of the first temple part 10 and the temple tip part 22 of the second temple part 20. The temple tip part 12 and the temple tip part 22 are removably connected to the first temple part 10 and the second temple part 20 through the connection section CP3 and the connection section CP4, respectively.

In FIG. 6, power supplied from the battery 16 provided to the first temple part 10 is supplied to the display device 50 provided to the first temple part 10 and the imaging device 32 provided to the front part 30 to drive the display device 50 and the imaging device 32. Power supplied from the battery 26 provided to the second temple part 20 is supplied to the processing section 62, the storage section 64, and the communication section 66 provided to the second temple part 20 to drive the processing section 62, the storage section 64, and the communication section 66. Note that power supplied from the battery 26 provided to the second temple part 20 may be supplied to the imaging device 32. Alternatively, a battery may be provided to only one of the first temple part 10 and the second temple part 20, and the imaging device 32, the display device 50, the processing section 62, the storage section 64, and the communication section 66 may be driven using power supplied from the battery. In FIG. 6, the first temple part 10 (right temple part) and the second temple part 20 (left temple part) may be interchanged to change the display system from right to left.

Figure 7:
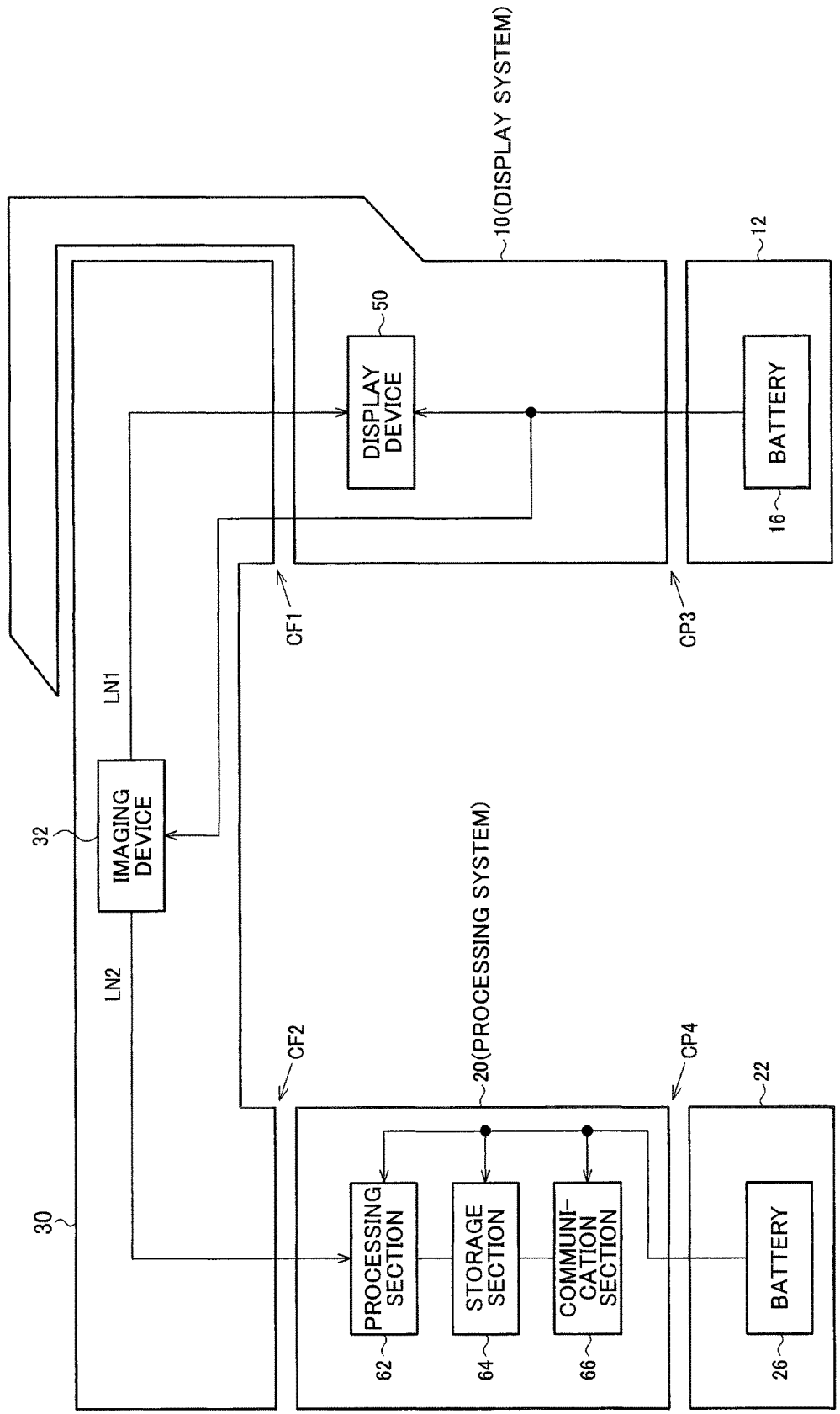
FIG. 7 is a view illustrating a parallel processing mode.

FIG. 7 is a view illustrating the parallel processing mode in detail. In FIG. 7, the connection lines LN1 and LN2 are provided, but the connection line LN3 (see FIG. 6) is not provided. The image signal from the imaging device 32 is input to the display device 50 provided to the first temple part 10 through the connection line LN1, and the display device 50 displays the captured image. The image signal from the imaging device 32 is input to the processing section 62, the storage section 64, and the communication section 66 provided to the second temple part 20 through the connection line LN2. The processing section 62 performs image processing on the input image signal. The information about the image signal may be stored in the storage section 64 that is implemented by a hard disk, a semiconductor memory, or the like, and may be transmitted to an external device through wireless communication implemented by the communication section 66, for example.

The serial processing mode and the parallel processing mode according to one embodiment of the invention make it possible to use the processing results obtained by one of the temple parts for the other front part, or perform different types of processing on the signal from the front part using the two temple parts. This makes it possible to implement various types of processing that cannot be implemented by a known eyeglass-type wearable device.

3. Interchange Between Right Temple Part and Left Temple Part

The eyeglass-type wearable device according to one embodiment of the invention is configured so that the right temple part and the left temple part can be interchanged. More specifically, the first connection section CF1 of the front part 30 is a connection section to which the second temple part 20 can be connected instead of the first temple part 10. The second connection section CF2 of the front part 30 is a connection section to which the first temple part 10 can be connected instead of the second temple part 20. The details of the interchangeable configuration are described below.

Figure 8A:
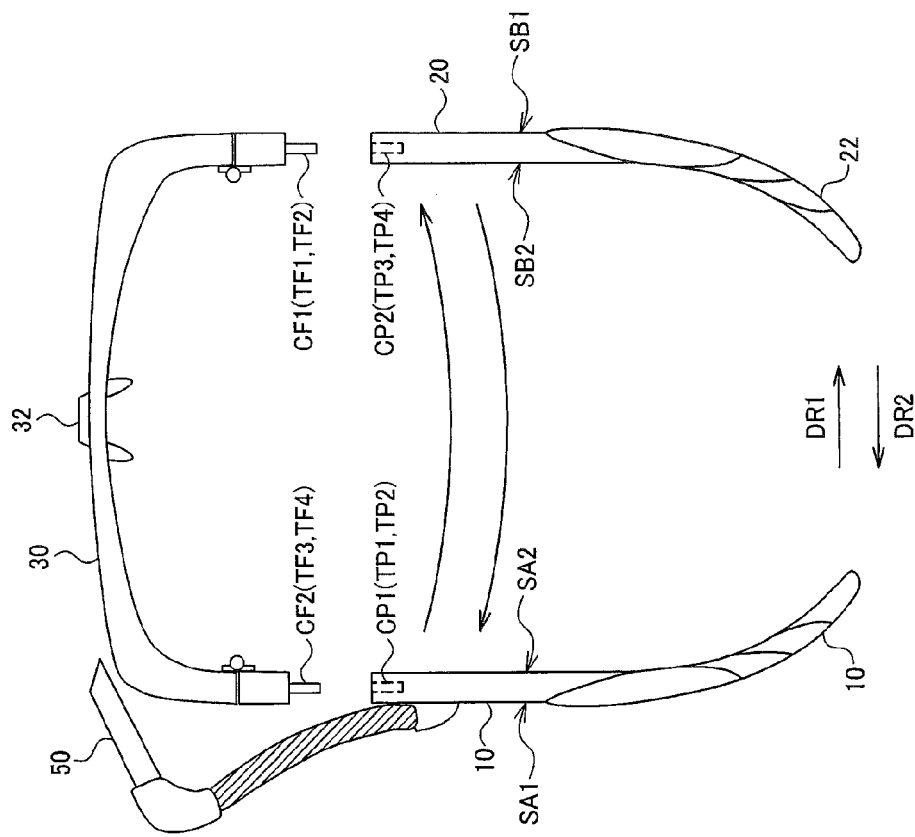
FIGS. 8A and 8B are views illustrating a state in which a first temple part and a second temple part are interchanged.

In FIG. 8A, the first temple part 10 is connected to the connection section CF1 of the front part 30, and the second temple part 20 is connected to the connection section CF2 of the front part 30. Specifically, the connection section CP1 of the first temple part 10 is connected to the connection section CF1 of the front part 30, and the connection section CP2 of the second temple part 20 is connected to the connection section CF2 of the front part 30.

In FIG. 8A, the imaging device 32 is provided to the front part 30, the display device 50 is provided to the first temple part 10, and the battery 24 (see FIG. 4) is provided to the second temple part 20, for example. In this case, an image captured by the imaging device 32 can be displayed on the display device 50 provided to the first temple part 10, and power supplied from the battery 24 provided to the second temple part 20 can be supplied to the imaging device 32 and the display device 50 provided to the first temple part 10 through the connection line LC (see FIG. 1) to drive (operate) the imaging device 32 and the display device 50. Since the display device 50 is provided on the side of the right eye of the user, the display image (e.g., an image captured by the imaging device 32) can be displayed on the side of the right eye of the user in a see-through HMD manner.

Figure 8B:
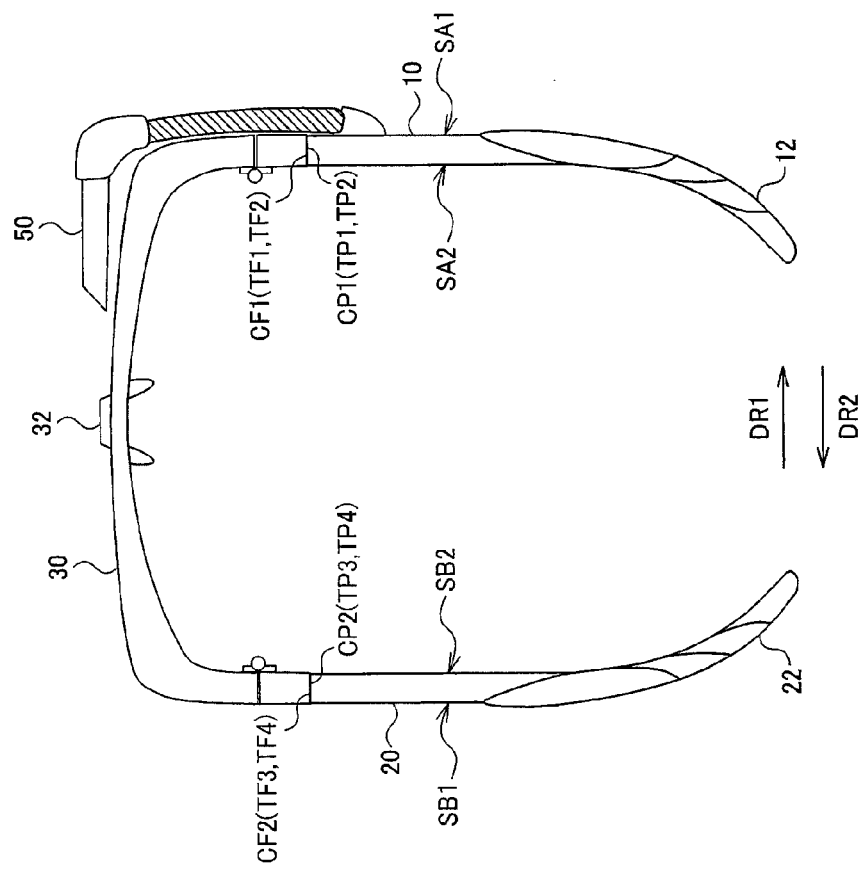

In FIG. 8B, the right temple part and the left temple part have been interchanged as compared with the state illustrated in FIG. 8A (i.e., the second temple part 20 is connected to the connection section CF1 of the front part 30, and the first temple part 10 is connected to the connection section CF2 of the front part 30). More specifically, the connection section CP2 of the second temple part 20 is connected to the connection section CF1 of the front part 30, and the connection section CP1 of the first temple part 10 is connected to the connection section CF2 of the front part 30. Therefore, the display image that is displayed on the side of the right eye of the user in FIG. 8A can be displayed on the side of the left eye of the user in FIG. 8B. This makes it possible to deal with a situation in which the user desires that the display image be displayed on the side of the left eye of the user, for example.

In order to make it possible to interchange the right temple part and the left temple part (see FIGS. 8A and 8B), the first temple part 10 and the second temple part 20 are designed to have a symmetrical structure in the vertical direction.

More specifically, the first temple part 10 is connected to the first connection section CF1 of the front part 30 so that a first side SA1 of the first temple part 10 faces in a first direction DR1, and a second side SA2 of the first temple part 10 faces in a second direction DR2 that is opposite to the first direction DR1 (see FIG. 8A). The first side SA1 is a side that faces in the direction opposite to the user when the eyeglass-type wearable device is worn by the user. For example, the side illustrated in FIG. 3A is the first side SA1 of the first temple part 10. The second side SA2 is a side opposite to the first side SA1. The second side SA2 faces the temporal region of the user when the eyeglass-type wearable device is worn by the user.

The first temple part 10 is connected to the second connection section CF2 of the front part 30 so that the first side SA1 faces in the second direction DR2, and the second side SA2 faces in the first direction DR1 (see FIG. 8B). Specifically, when changing the connection state from the connection state illustrated in FIG. 8A (i.e., the first temple part 10 is connected to the first connection section CF1) to the connection state illustrated in FIG. 8B (i.e., the first temple part 10 is connected to the second connection section CF2), the first temple part 10 is rotated by 180°, and connected to the second connection section CF2 so that each side faces in the opposite direction.

The second temple part 20 is connected to the second connection section CF2 of the front part 30 so that a first side SB1 of the second temple part 20 faces in the second direction DR2, and a second side SB2 of the second temple part 20 faces in the first direction DR1 (see FIG. 8A). The first side SB1 is a side that faces in the direction opposite to the user when the eyeglass-type wearable device is worn by the user. For example, the side illustrated in FIG. 4 is the first side SB1 of the second temple part 20. The second side SB2 is a side opposite to the first side SB1. The second side SB2 faces the temporal region of the user when the eyeglass-type wearable device is worn by the user.

The second temple part 20 is connected to the first connection section CF1 of the front part 30 so that the first side SB1 faces in the first direction DR1, and the second side SB2 faces in the second direction DR2 (see FIG. 8B). Specifically, when changing the connection state from the connection state illustrated in FIG. 8A (i.e., the second temple part 20 is connected to the second connection section CF2) to the connection state illustrated in FIG. 8B (i.e., the second temple part 20 is connected to the first connection section CF1), the second temple part 20 is rotated by 180°, and connected to the first connection section CF1 so that each side faces in the opposite direction.

Figure 9A:
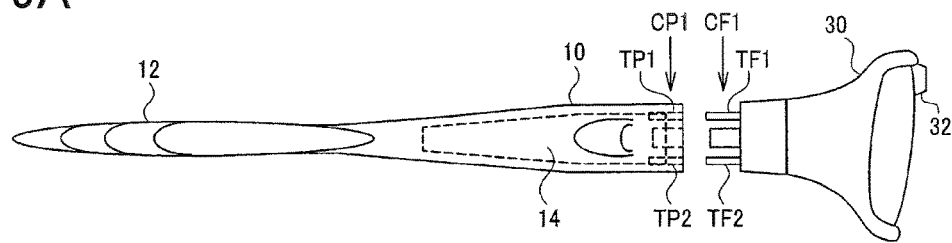
FIGS. 9A to 9D are views illustrating a state in which a first temple part and a second temple part are interchanged.
Figure 9B:
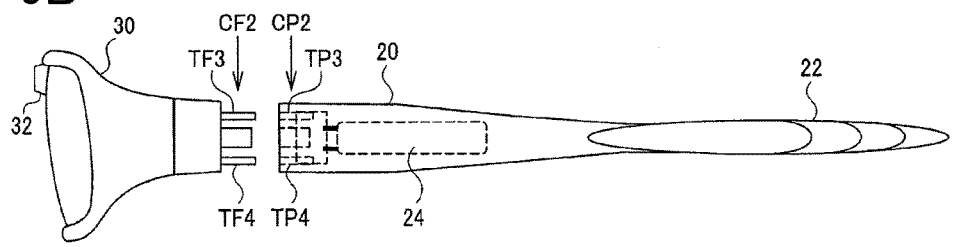

As illustrated in FIGS. 9A and 9B, the first connection section CF1 of the front part 30 includes the first terminal TF1 and the second terminal TF2, and the second connection section CF2 of the front part 30 includes the third terminal TF3 and the fourth terminal TF4. The first temple part 10 (connection section CP1) includes the first temple-side terminal TP1 and the second temple-side terminal TP2, and the second temple part 20 (connection section CP2) includes the third temple-side terminal TP3 and the fourth temple-side terminal TP4. An example in which each of the first connection section CF1, the second connection section CF2, the first temple part 10 (CP1), and the second temple part 20 (CP2) includes two terminals is described below for convenience of explanation. Note that the configuration is not limited thereto. For example, each of the first connection section CF1, the second connection section CF2, the first temple part 10 (CP1), and the second temple part 20 (CP2) may include three or more terminals.

Figure 9C:
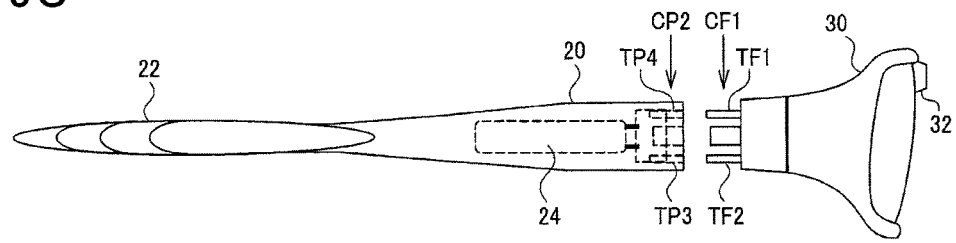
Figure 9D:
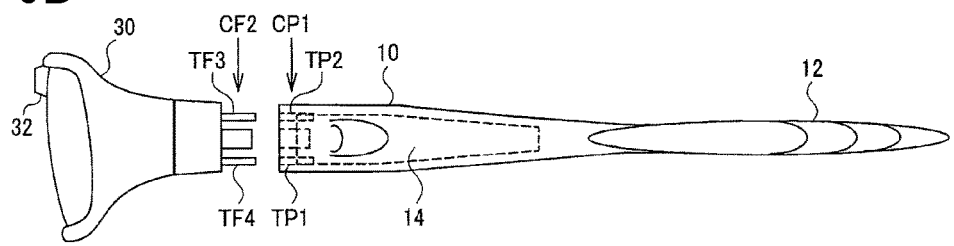

FIGS. 9A and 9B illustrate a terminal connection state when the first temple part 10 is connected to the first connection section CF1, and the second temple part 20 is connected to the second connection section CF2 as illustrated in FIG. 8A. FIGS. 9C and 9D illustrate a terminal connection state when the second temple part 20 is connected to the first connection section CF1, and the first temple part 10 is connected to the second connection section CF2 as illustrated in FIG. 8B. Specifically, FIG. 9C differs from FIG. 9A in that the second temple part 20 is connected to the first connection section CF1 of the front part 30 instead of the first temple part 10, and FIG. 9D differs from FIG. 9B in that the first temple part 10 is connected to the second connection section CF2 of the front part 30 instead of the second temple part 20.

The first temple-side terminal TP1 of the first temple part 10 is connected to the first terminal TF1 of the first connection section CF1 when the first temple part 10 is connected to the first connection section CF1 (see FIG. 9A). The first temple-side terminal TP1 of the first temple part 10 is connected to the fourth terminal TF4 of the second connection section CF2 when the first temple part 10 is connected to the second connection section CF2 (see FIG. 9D).

The second temple-side terminal TP2 of the first temple part 10 is connected to the second terminal TF2 of the first connection section CF1 when the first temple part 10 is connected to the first connection section CF1 (see FIG. 9A). The second temple-side terminal TP2 of the first temple part 10 is connected to the third terminal TP3 of the second connection section CF2 when the first temple part 10 is connected to the second connection section CF2 (see FIG. 9D).

The third temple-side terminal TP3 of the second temple part 20 is connected to the third terminal TF3 of the second connection section CF2 when the second temple part 20 is connected to the second connection section CF2 (see FIG. 9B). The third temple-side terminal TP3 of the second temple part 20 is connected to the second terminal TF2 of the first connection section CF1 when the second temple part 20 is connected to the first connection section CF1 (see FIG. 9C).

The fourth temple-side terminal TP4 of the second temple part 20 is connected to the fourth terminal TP4 of the second connection section CF2 when the second temple part 20 is connected to the second connection section CF2 (see FIG. 9B). The fourth temple-side terminal TP4 of the second temple part 20 is connected to the first terminal TF1 of the first connection section CF1 when the second temple part 20 is connected to the first connection section CF1 (see FIG. 9C).

According to one embodiment of the invention, since the first temple part 10 and the second temple part 20 have a symmetrical structure in the vertical direction as to the pin arrangement and the like, it is possible to interchange the right temple part and the left temple part as illustrated in FIGS. 8A and 8B. This makes it possible to interchange the electrical parts (e.g., display device) corresponding to the preference of the user, and deal with a wide variety of applications.

In one embodiment of the invention, the front part 30 electrically disconnects the electrical unit provided to the temple part connected to the first connection section CF1 and the electrical unit provided to the temple part connected to the second connection section CF2 when temple parts that are identical in type (i.e., first temple parts or second temple parts) are respectively connected to the first connection section CF1 and the second connection section CF2 (as described below).

The method employed when the right temple part and the left temple part are interchanged is described in detail below with reference to FIGS. 10A to 10C.

As illustrated in FIG. 10A, a display device is provided to the first temple part 10 as the first electrical unit, and a battery is provided to the second temple part 20 as the second electrical unit. A first connection line LC1 and a second connection line LC2 that electrically connect the display device provided to the first temple part 10 and the battery provided to the second temple part 20 are provided to the front part 30. The first connection line LC1 and the second connection line LC2 are also connected to the imaging device provided to the front part 30. A VDD connection line and a GND connection line are required when connecting a battery and an electrical part. Note that the following description is given taking the VDD connection line as an example for convenience of explanation.

As illustrated in FIG. 10A, the first connection line LC1 provided to the front part 30 electrically connects the display device (first electrical unit in a broad sense) provided to the first temple part 10 and the battery (second electrical unit in a broad sense) provided to the second temple part 20 when the first temple part 10 is connected to the first connection section CF1 of the front part 30, and the second temple part 20 is connected to the second connection section CF2 of the front part 30. Specifically, the display device provided to the first temple part 10 and the battery provided to the second temple part 20 are electrically connected through the first connection line LC1 provided to the front part 30 when the connection state illustrated in FIG. 8A is established. The imaging device provided to the front part 30 and the battery provided to the second temple part 20 can also be electrically connected through the first connection line LC1.

As illustrated in FIG. 10B, the second connection line LC2 provided to the front part 30 electrically connects the display device (first electrical unit) provided to the first temple part 10 and the battery (second electrical unit) provided to the second temple part 20 when the second temple part 20 is connected to the first connection section CF1 of the front part 30, and the first temple part 10 is connected to the second connection section CF2 of the front part 30. Specifically, the display device provided to the first temple part 10 and the battery provided to the second temple part 20 are electrically connected through the second connection line LC2 provided to the front part 30 when the connection state illustrated in FIG. 8B is established. The imaging device provided to the front part 30 and the battery provided to the second temple part 20 can also be electrically connected through the second connection line LC2.

More specifically, the first connection section CF1 of the front part 30 includes the first terminal TF1 and the second terminal TF2, the first terminal TF1 is connected to the first connection line LC1, and the second terminal TF2 is connected to the second connection line LC2.

The second connection section CF2 of the front part 30 includes the third terminal TF3 and the fourth terminal TF4, the third terminal TF3 is connected to the first connection line LC1, and the fourth terminal TF4 is connected to the second connection line LC2.

When the first temple part 10 is connected to the first connection section CF1, and the second temple part 20 is connected to the second connection section CF2 (see FIG. 8A), the display device (first electrical unit) provided to the first temple part 10 and the battery (second electrical unit) provided to the second temple part 20 are electrically connected through the first terminal TF1 of the first connection section CF1, the first connection line LC1, and the third terminal TF3 of the second connection section CF2 (see FIG. 10A). The imaging device provided to the front part 30 and the battery provided to the second temple part 20 are electrically connected through the first connection line LC1 and the third terminal TF3 of the second connection section CF2.

Specifically, the first temple-side terminal TP1 connected to the display device is connected to the first terminal TF1, the third temple-side terminal TP3 connected to the battery is connected to the third terminal TF3, and the first terminal TF1 and the third terminal TF3 are connected through the first connection line LC1 (see FIGS. 9A and 9B). The display device (electrical part) provided to the first temple part 10 and the imaging device provided to the front part 30 are thus electrically connected to the battery provided to the second temple part 20, and power supplied from the battery provided to the second temple part 20 can be supplied to the display device (electrical part) provided to the first temple part 10 and the imaging device provided to the front part 30.

When the second temple part 20 is connected to the first connection section CF1, and the first temple part 10 is connected to the second connection section CF2 (see FIG.

8B), the battery (second electrical unit) provided to the second temple part 20 and the display device (first electrical unit) provided to the first temple part 10 are electrically connected through the second terminal TF2 of the first connection section CF1, the second connection line LC2, and the fourth terminal TF4 of the second connection section CF2 (see FIG. 10B). The battery provided to the second temple part 20 and the imaging device provided to the front part 30 are electrically connected through the second terminal TF2 of the first connection section CF1 and the second connection line LC2.

Specifically, the third temple-side terminal TP3 connected to the battery is connected to the second terminal TF2, the first temple-side terminal TP1 connected to the display device is connected to the fourth terminal TF4, and the second terminal TF2 and the fourth terminal TF4 are connected through the second connection line LC2 (see FIGS. 9C and 9D). The display device provided to the first temple part 10 and the imaging device provided to the front part 30 are thus electrically connected to the battery provided to the second temple part 20, and power supplied from the battery provided to the second temple part 20 can be supplied to the display device provided to the first temple part 10 and the imaging device provided to the front part 30.

In one embodiment of the invention, when temple parts that are identical in type and provided with a battery are respectively connected to the first connection section CF1 and the second connection section CF2, the front part 30 electrically disconnects the batteries to prevent occurrence of a short circuit.

In FIG. 10C, a second temple part 20-1 provided with a battery is connected to the first connection section CF1 of the front part 30, and a second temple part 20-2 provided with a battery is connected to the second connection section CF2 of the front part 30, for example. In this case, the front part 30 electrically disconnects the batteries to prevent occurrence of a short circuit.

For example, the third temple-side terminal TP3 of the second temple part 20-1 is connected to the second terminal TF2 of the front part 30, and the second terminal TF2 is connected to the second connection line LC2. The third temple-side terminal TP3 of the second temple part 20-2 is connected to the third terminal TF3 of the front part 30, and the third terminal TF3 is connected to the first connection line LC1. As illustrated in FIG. 10C, the first connection line LC1 and the second connection line LC2 are electrically disconnected. Therefore, the battery provided to the second temple part 20-1 and the battery provided to the second temple part 20-2 are electrically disconnected, and occurrence of a short circuit between the batteries can be prevented.

According to the method illustrated in FIGS. 10A to 10C, appropriate connection can be implemented when temple parts that differ in type (e.g., a temple part provided with a battery and a temple part provided with a display device) are connected to the front part 30, even when the right temple part and the left temple part are interchanged. On the other hand, when temple parts that are identical in type (e.g., temple parts provided with a battery) are respectively connected to the first connection section CF1 and the second connection section CF2, it is possible to effectively prevent a situation in which the batteries are connected, and short-circuited, since the connection line LC1 and the connection line LC2 are electrically disconnected.

Figure 11A:
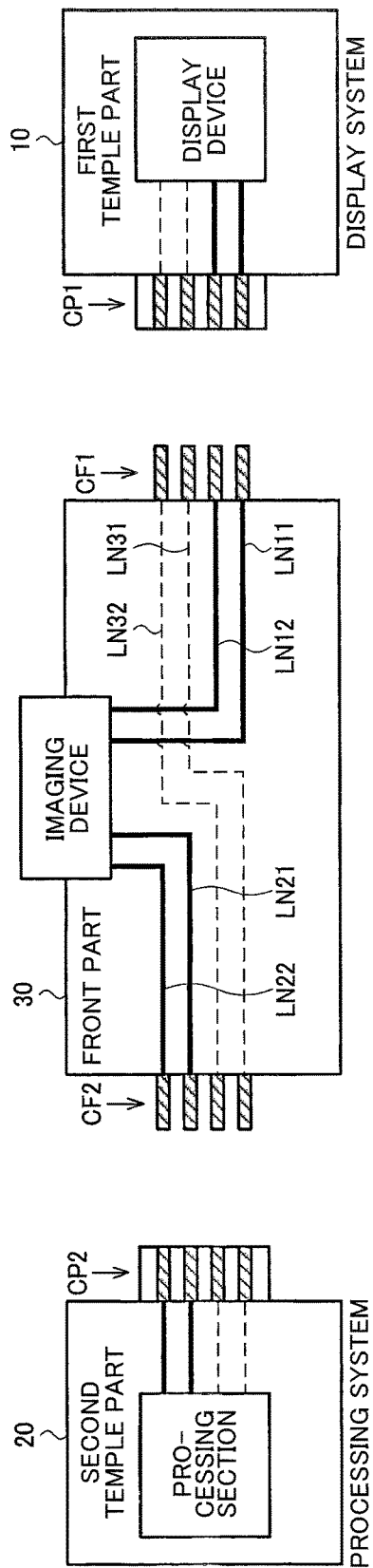
FIGS. 11A and 11B are views illustrating connection lines provided to a front part.

In FIG. 11A, a display device is provided to the display-system first temple part 10 as the electrical unit, and a processing section (or a storage section or a communication section) is provided to the processing-system second temple part 20 as the electrical unit.

As illustrated in FIG. 11A, a connection line LN11 and a connection line LN12 for connecting the electrical unit provided to the first temple part 10 are provided to the front part 30. Therefore, when the first temple part 10 is connected to the first connection section CF1 of the front part 30, the imaging device provided to the front part 30 and the display device provided to the first temple part 10 are electrically connected through the connection line LN11 and the connection line LN12.

A connection line LN21 and a connection line LN22 for connecting the electrical unit provided to the second temple part 20 are provided to the front part 30. Therefore, when the second temple part 20 is connected to the second connection section CF2 of the front part 30, the imaging device provided to the front part 30 and the processing section or the like provided to the second temple part 20 are electrically connected through the connection line LN21 and the connection line LN22.

A connection line LN31 and a connection line LN32 that directly connect the first temple part 10 and the second temple part 20 (i.e., without connecting the imaging device) are provided to the front part 30. Therefore, when the first temple part 10 is connected to the first connection section CF1 of the front part 30, and the second temple part 20 is connected to the second connection section CF2 of the front part 30, the display device provided to the first temple part 10 and the processing section or the like provided to the second temple part 20 are electrically connected through the connection line LN31 and the connection line LN32.

Figure 11B:
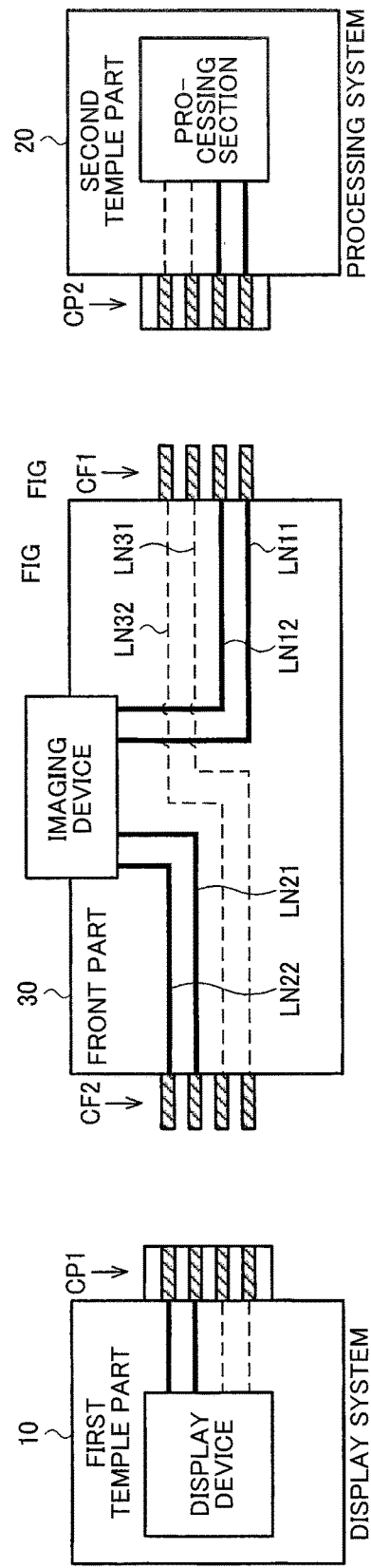

When the right temple part and the left temple part are interchanged as illustrated in FIG. 11B, the imaging device provided to the front part 30 and the display device provided to the first temple part 10 are electrically connected through the connection line LN21 and the connection line LN22. The imaging device provided to the front part 30 and the processing section or the like provided to the second temple part 20 are electrically connected through the connection line LN11 and the connection line LN12. The first temple part 10 and the second temple part 20 are electrically connected through the connection line LN31 and the connection line LN32 in the same manner as in FIG. 11A. Therefore, it is possible to implement appropriate signal connection even when the right temple part and the left temple part are interchanged.

4. Temple Part

In one embodiment of the invention, the temple part can be attached to and removed from the front part, and various temple parts can be connected to the front part corresponding to the application. Various examples of the temple part are described below.

FIGS. 12A and 12B illustrate a detailed example of the temple part. The temple part 10 has a configuration in which a battery 16 is provided to a temple tip part 12. The temple part 10 includes a connection section CP3 through which the temple tip part 12 provided with the battery 16 is removably connected. For example, when the temple tip part 12 is connected to the temple part 10 through the connection section CP3, power supplied from the battery 16 provided to the temple tip part 12 is supplied to the circuit board 14 through connection lines LB1 to LB4 to drive the electrical parts mounted on the circuit board 14. The temple tip part 12 provided with the battery 16 is designed to be removable. The battery 16 provided to the temple tip part 12 can be charged using a charging device or the like by removing the temple tip part 12 from the temple part 10.

According to this configuration, even if the battery has gone dead, the user can immediately operate the electrical parts included in the temple part by replacing the temple tip part with a reserve temple tip part provided with a battery. In this case, since it is unnecessary to replace the temple part (main body), and it suffices to replace the temple tip part having a small size, convenience to the user can be improved.

Figure 13A:
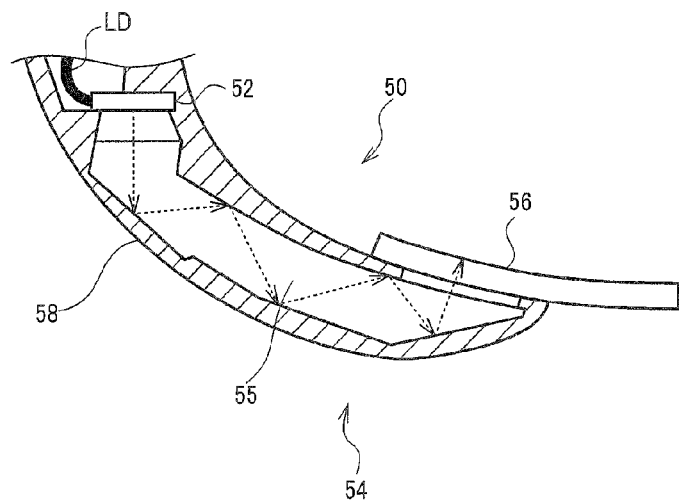
FIGS. 13A and 13B are views illustrating a display device.

In FIG. 12A, the display device 50 is provided to the temple part 10. As illustrated in FIG. 13A, the display device 50 includes a display section 52, an eyepiece optical system 54, and a support section 58.

The display section 52 (display or display device) is implemented by an LCD, an OLED, or the like, and displays an image. The display section 52 is electrically connected to and driven by a driver mounted on the circuit board 14 illustrated in FIG. 3B through a connection line LD. The eyepiece optical system 54 is an optical system that allows the user to observe the image displayed on the display section 52 as a virtual image. The eyepiece optical system 54 includes optical components such as a light-guiding section 55 and an eye piece 56. The display image light from the display section 52 is guided to the eye piece 56 by the light-guiding section 55 of the eyepiece optical system 54. The support section 58 is a member that supports (positions) the eye piece 56 of the eyepiece optical system 54 in front of the front part 30. Specifically, the support section 58 supports the eye piece 56 in front of the right eye or the left eye of the user. The support section 58 is designed to be flexible. The user can adjust the position of the eye piece 56 by bending the support section 58.

Figure 13B:
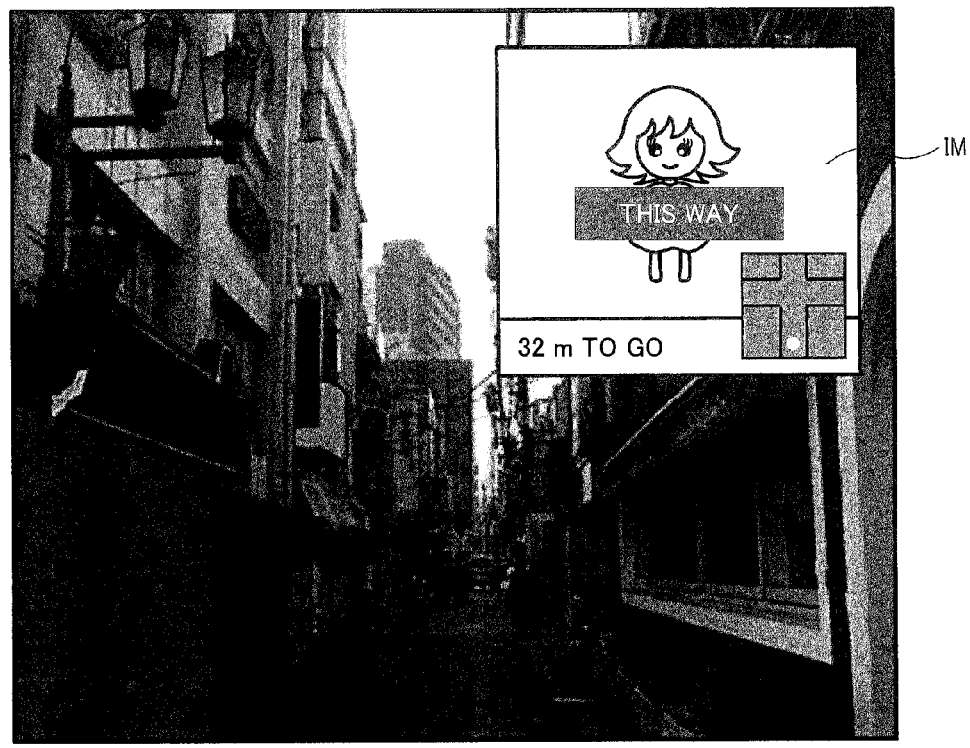

It is possible to implement a see-through HMD image display (see FIG. 13B) by utilizing the display device 50 having the configuration illustrated in FIG. 13A. Specifically, an image IM generated by the display device 50 can be superimposed on the field of view (sight) of the user. In FIG. 13B, the navigation image IM that guides the user is superimposed on the field of view (sight) of the user. Note that the configuration of the display device 50 is not limited to the configuration illustrated in FIG. 13A. Various modifications and variations may be made.

Figure 14A:
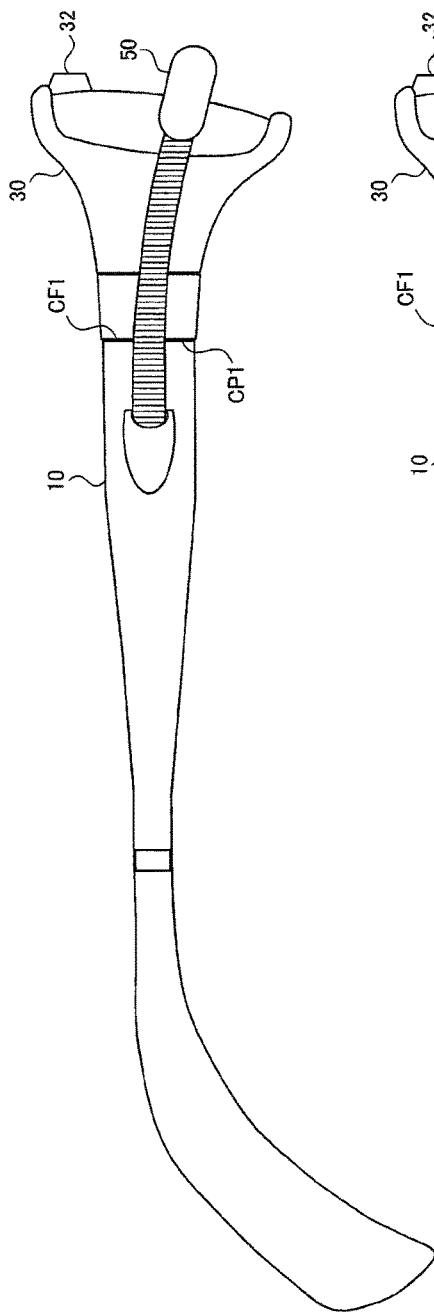
FIGS. 14A to 14C are views illustrating a method that changes or enhances a function by replacing a temple part.
Figure 14B:
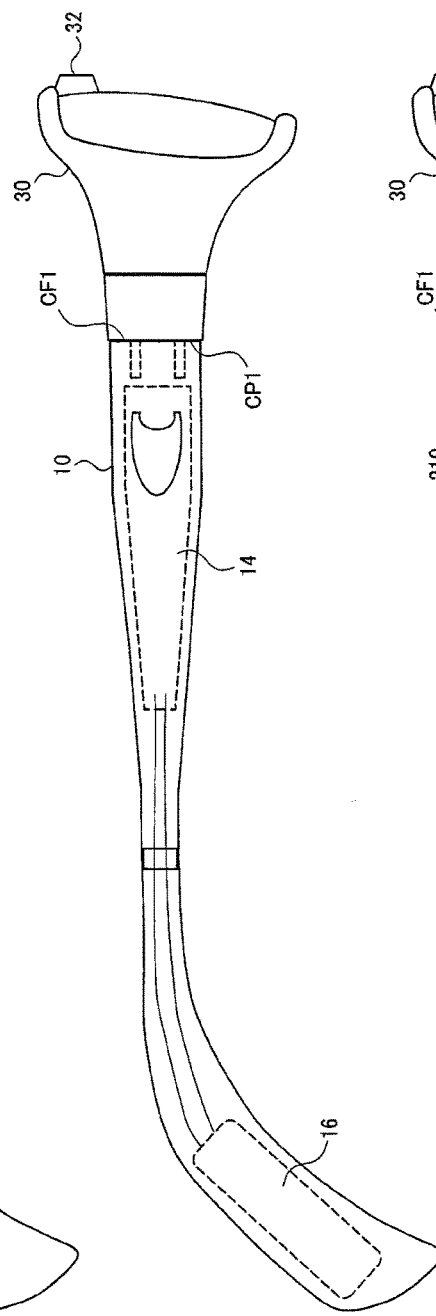

In one embodiment of the invention, temple parts corresponding to a wide variety of applications can be removably connected to the front part of the eyeglass-type wearable device. In FIGS. 14 and 14B, the temple part 10 that is provided with the circuit board 14 and the battery 16 that supplies power to the circuit board 14 and the like is connected to the connection section CF1 of the front part 30, for example. An image as illustrated in FIG. 13B can be displayed in front of the right eye of the user by providing a driver that drives the display section 52 (display panel) of the display device 50 (see FIG. 13A) on the circuit board 14, for example.

Figure 14C:
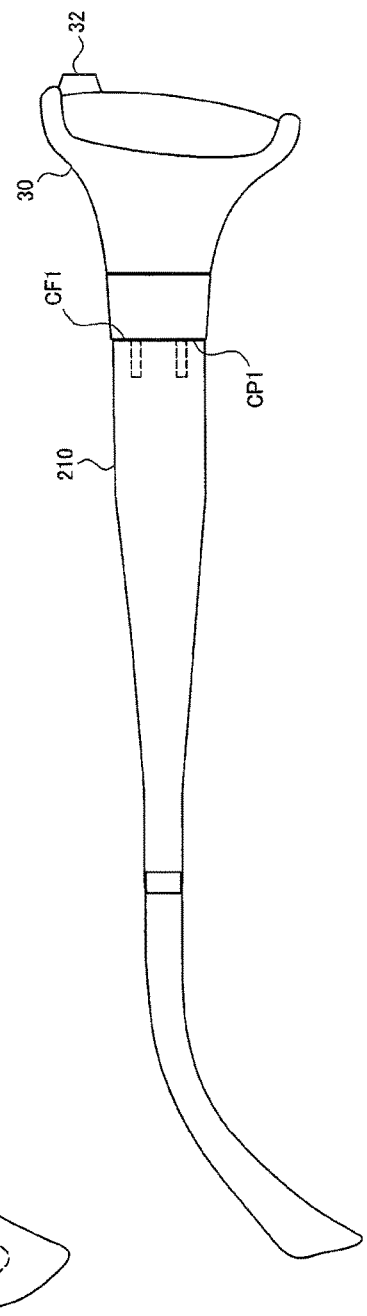

In FIG. 14C, a normal eyeglass temple part 210 that is not provided with an electrical system (e.g., circuit board 14 and battery 16 (see FIGS. 14A and 14B)) is connected to the connection section CF1 of the front part 30. For example, when the user does not desire that an image as illustrated in FIG. 13B be displayed, it is possible to meet the user demand by connecting the normal eyeglass temple part 210 illustrated in FIG. 14C to the front part 30.

Figure 15A:
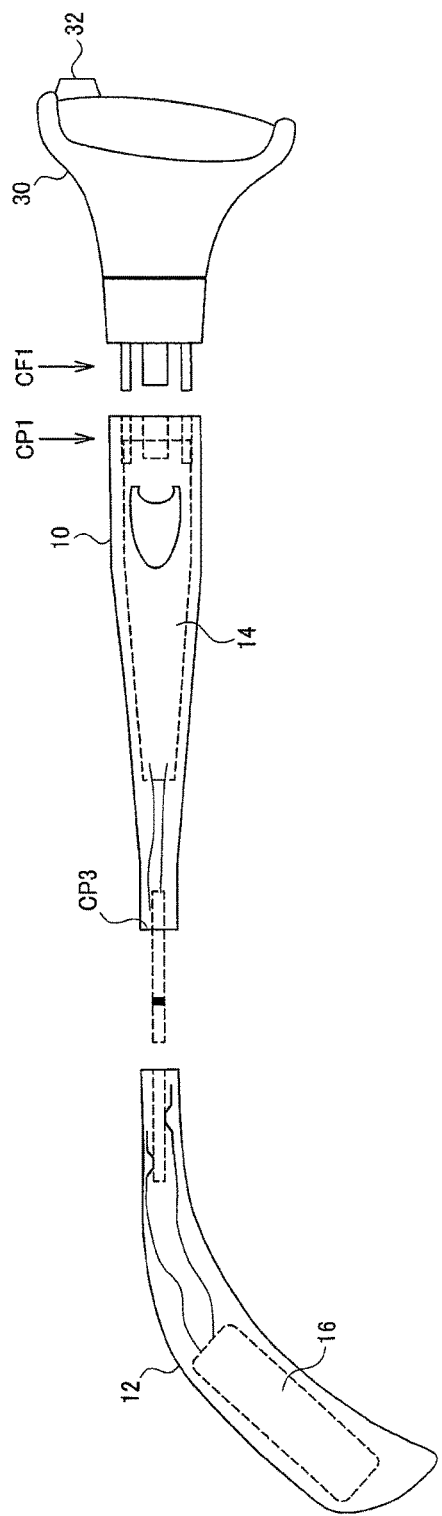
FIGS. 15A and 15B are views illustrating a method that changes or enhances a function by replacing a temple part.
Figure 15B:
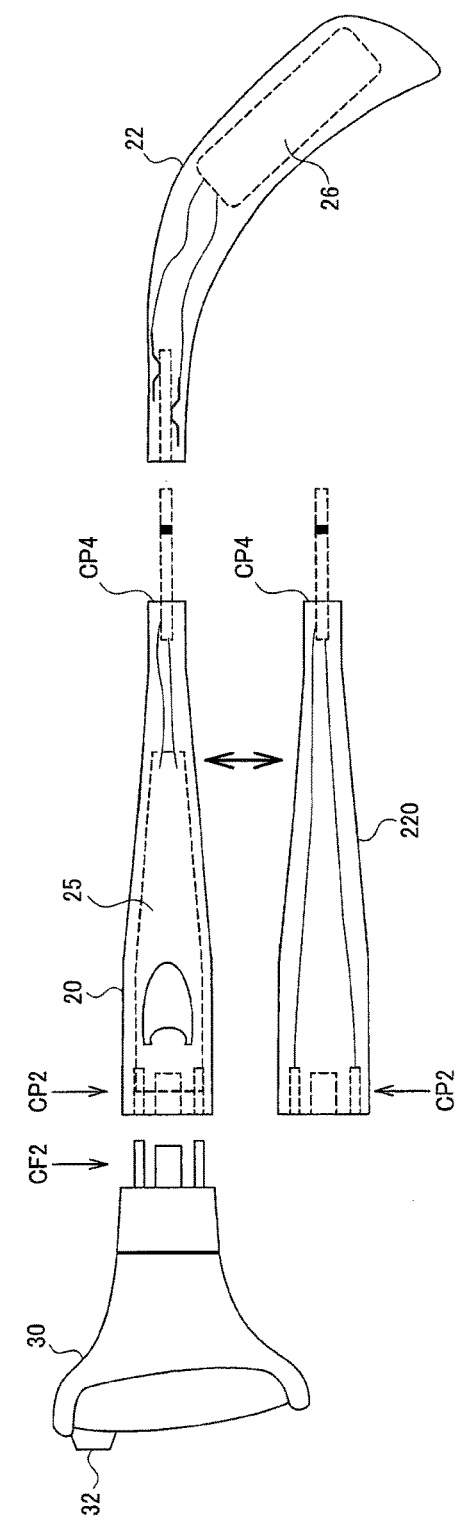

In FIG. 15A, the connection section CP3 to which the temple tip part 12 is connected is provided to the temple part 10, and the temple tip part 12 provided with the battery 16 can be attached to and removed from the temple part 10. In FIG. 15B, the connection section CP4 to which the temple tip part 22 is connected is provided to the temple part 20, and the temple tip part 22 provided with the battery 26 can be attached to and removed from the temple part 20. In FIG. 15B, a circuit board 25 is provided to the temple part 20, and an optional function (e.g., sensor or TV tuner) can be implemented by the circuit board 25. For example, when the display device 50 is provided to the right temple part 10, and a TV tuner is provided to the left temple part 20, the user can watch a TV image by the TV tuner using the display device 50.

In FIG. 15B, the temple part 20 that is provided with the circuit board 25 can be replaced with a temple part 220 that is not provided with the circuit board 25. For example, when the user does not desire the above optional function, the user uses the eyeglass-type wearable device in a state in which the temple part 220 is connected instead of the temple part 20. In this case, the temple tip part 22 provided with the battery 26 can be connected to the temple part 220, and power supplied from the battery 26 can be supplied to the temple part 10 through the front part 30.

When the temple tip parts 12 and 22 can be attached to and removed from the temple parts 10 and 20 (see FIGS. 15A and 15B), the right temple part and the left temple part can be interchanged by interchanging the temple parts 10 and 20 (see FIGS. 16A and 16B). In this case, since it is unnecessary to interchange the temple tip parts 12 and 22, the temple tip parts 12 and 22 that fit the shape of the ears of the user can be used directly. Specifically, it is possible to interchange only the temple parts 10 and 20 without interchanging the temple tip parts 12 and 22 that fit the right and left ears of the user.

Figure 17:
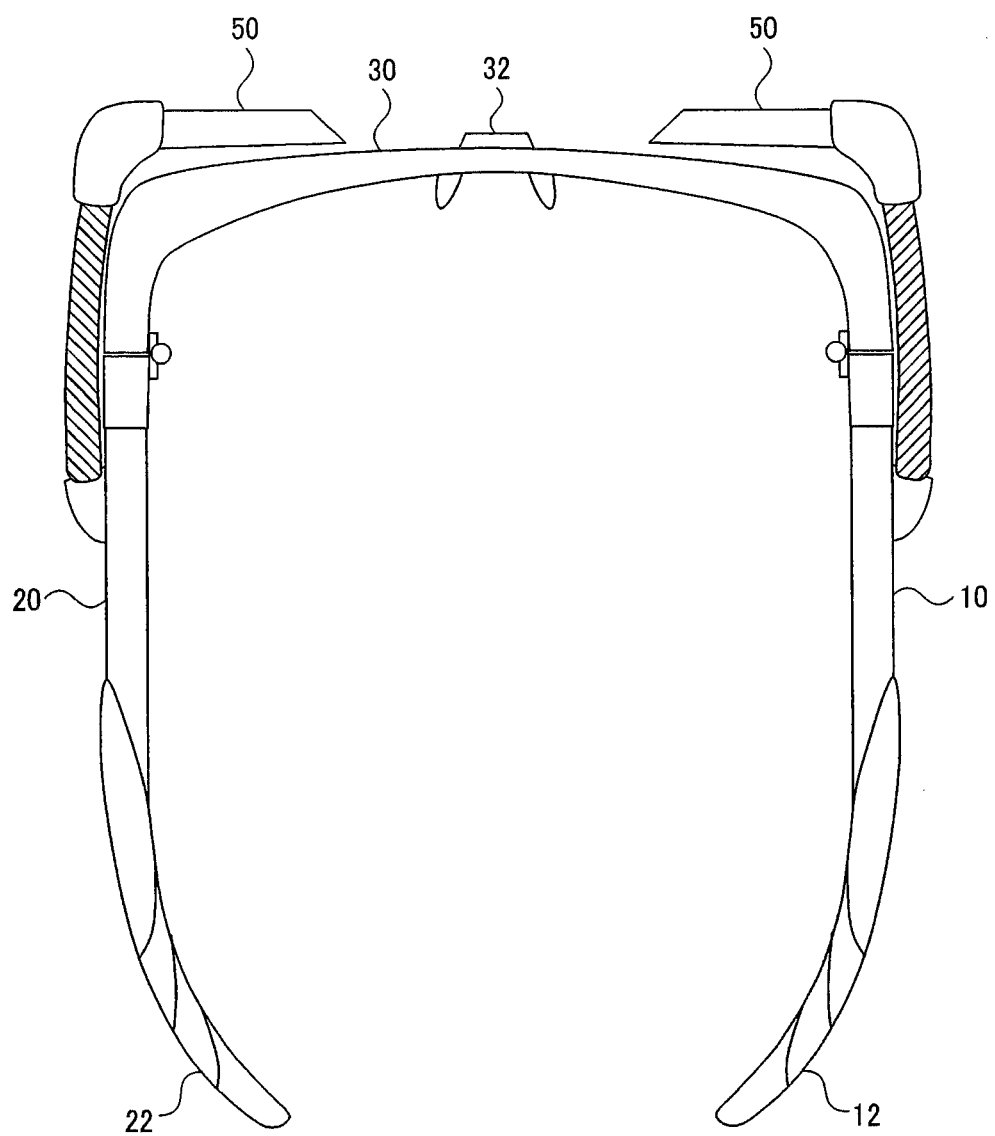
FIG. 17 illustrates an example in which a temple part provided with a display device is connected to the right side and the left side of a front part.

FIG. 17 illustrates an example in which the temple parts 10 and 20 respectively provided with the display device 50 are connected to the right side and the left side of the front part 30. According to this configuration, an image as illustrated in FIG. 13B can be displayed in front of both the right eye and the left eye of the user. In this case, it is possible to deal with a wide variety of applications by changing the content of the image displayed in front of the left eye and the content of the image displayed in front of the right eye, for example.

For example, when the imaging devices 32-1 and 32-2 are respectively provided to the front part 30 at positions corresponding to the right eye and the left eye of the user (see FIG. 2B), the image captured by the imaging device 32-1 may be displayed on the display device 50 provided to the temple part 10, and the image captured by the imaging device 32-2 may be displayed on the display device 50 provided to the temple part 20. This makes it possible to display a parallax image, for example.

According to one embodiment of the invention, it is possible to combine different types of temple part and front part in various ways. For example, it is possible to deal with various applications by replacing the temple part with a temple part having a different function. For example, it is possible to store the captured image in the temple part by utilizing a recording temple part that is provided with a storage section (hard disk or memory). Alternatively, the captured image may be sequentially transmitted to an external portable multi-functional terminal, a server, or the like by utilizing a temple part having a wireless communication function. It is also possible to select the resolution, the angle of view, the presence or absence of see-through display, the aspect ratio, and the like corresponding to the application by replacing the temple part provided with the display device with a temple part that differs in the specification of the display device.

Note that various structures may be employed for the connection sections of the front part and the temple part. For example, a connection section having the structure illustrated in FIGS. 18A and 18B may be employed.

Figure 18A:
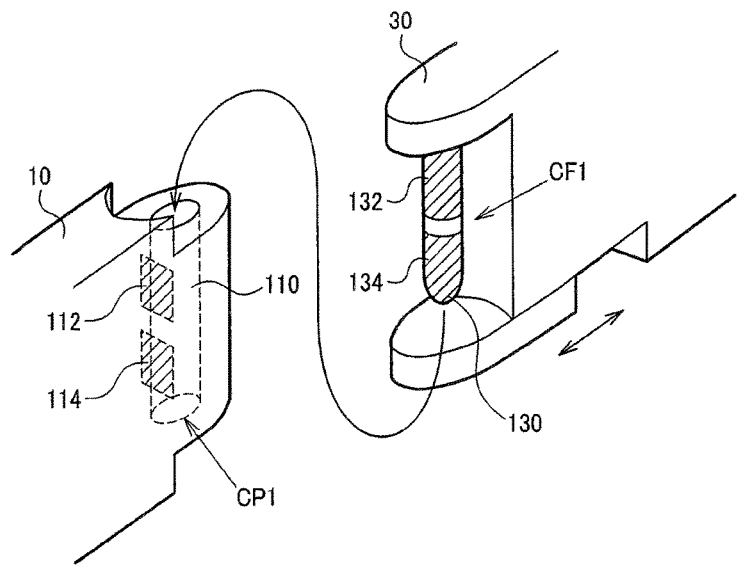
FIGS. 18A and 18B illustrate an example of the structure of a connection section.
Figure 18B:
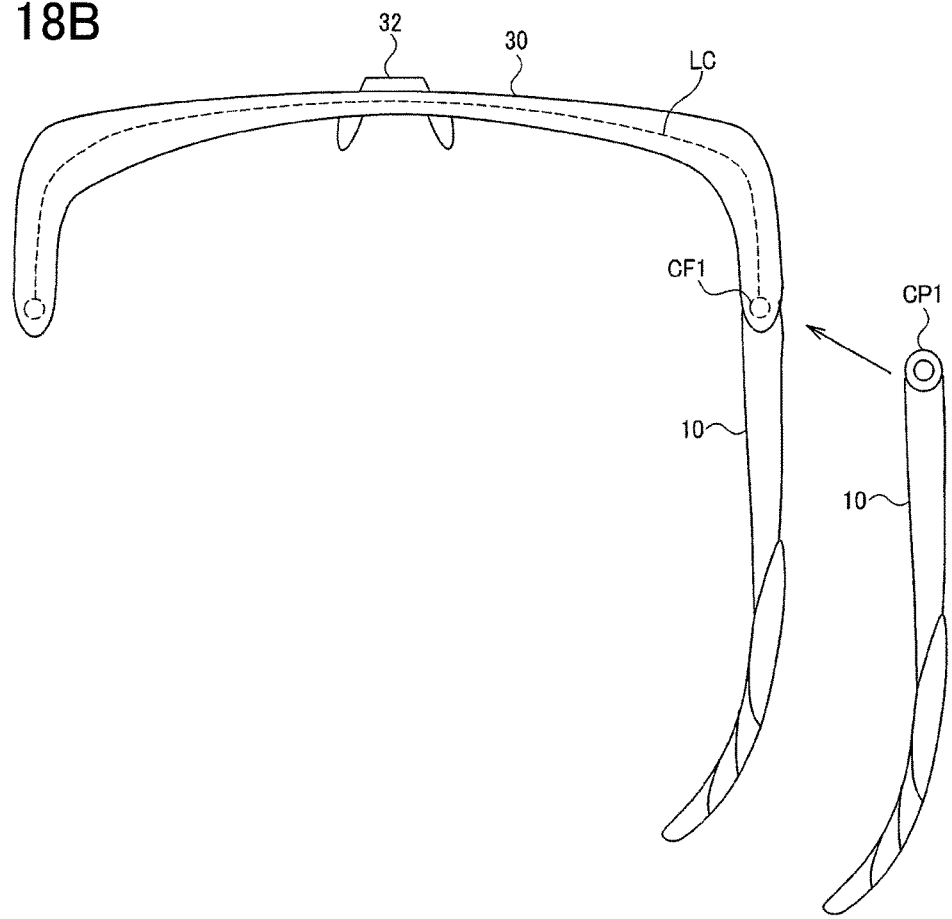

In FIG. 18A, the connection section CF1 of the front part 30 includes a pin jack 130, and electrodes 132 and 134 (terminals) provided to the pin jack 130. The connection section CP1 of the temple part 10 includes a receiving section 110 that receives the pin jack 130, and electrodes 112 and 114 (terminals) provided to the receiving section 110. As illustrated in FIG. 18B, the pin jack 130 is inserted into the receiving section 110 when connecting the front part 30 and the temple part 10. In this case, the electrodes 132 and 134 provided to the pin jack 130 come in contact with the electrodes 112 and 114 provided to the receiving section 110, and the front part 30 and the temple part 10 are electrically connected. Specifically, the electrical unit of the temple part 10 and the connection line LC of the front part 30 are electrically connected through connection between the electrodes 132 and 134 and the electrodes 112 and 114, and the electrical unit of the right temple part and the electrical unit of the left temple part, and the electrical unit of the temple part and the electrical unit of the front part are electrically connected.

5. Detection of Type of Temple Part

Figure 19:
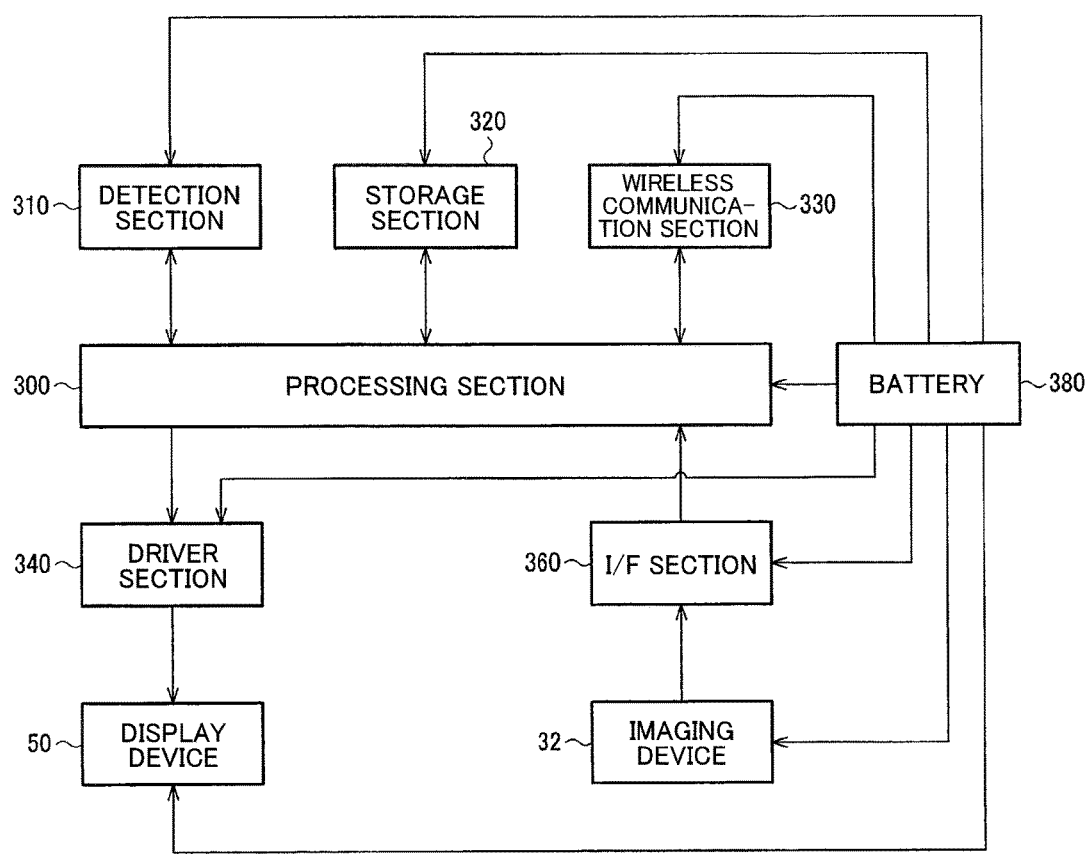
FIG. 19 is a block diagram illustrating the electrical configuration of an eyeglass-type wearable device.

FIG. 19 is a block diagram illustrating the electrical configuration of the eyeglass-type wearable device according to one embodiment of the invention (i.e., a functional block diagram illustrating the configuration of the electrical unit of the eyeglass-type wearable device).

In FIG. 19, a processing section 300 (processing section 62 illustrated in FIG. 6) performs a device control process and a calculation process. The function of the processing section 300 may be implemented by a processor (e.g., microcomputer), an ASIC, or the like.

A detection section 310 performs a detection process. A storage section 320 (storage section 64) is a memory (hard disk) that serves as a work area for the processing section 300 and the like, and stores image data. A wireless communication section 330 (communication section 66) performs a wireless communication process that implements communication with the outside. A driver section 340 drives the display device 50. When the display section of the display device 50 is an LCD, the driver section 340 is implemented by a liquid crystal driver. An I/F section 360 serves as an interface with the imaging device 32. The I/F section 360 controls the imaging device 32, and performs an image capture process. An image sensor (e.g., CCD or CMOS sensor) may be used as the imaging device 32. A battery 380 supplies power to each section of the eyeglass-type wearable device. The battery 380 is implemented by a secondary battery, a primary battery, or the like.

In one embodiment of the invention, the detection section 310 detects the type of the temple part connected to the front part. For example, the detection section 310 detects the type of temple part connected to the right side or the left side of the front part. The processing section 300 performs a process based on the detection result of the detection section 310. Specifically, the processing section 300 performs various processes (e.g., image processing, control process, and determination process) corresponding to the temple part type detection result.

The processing section 300 performs image processing based on the detection result of the detection section 310 on the image displayed on the display device 50, or the image captured by the imaging device 32.

Figure 20A:
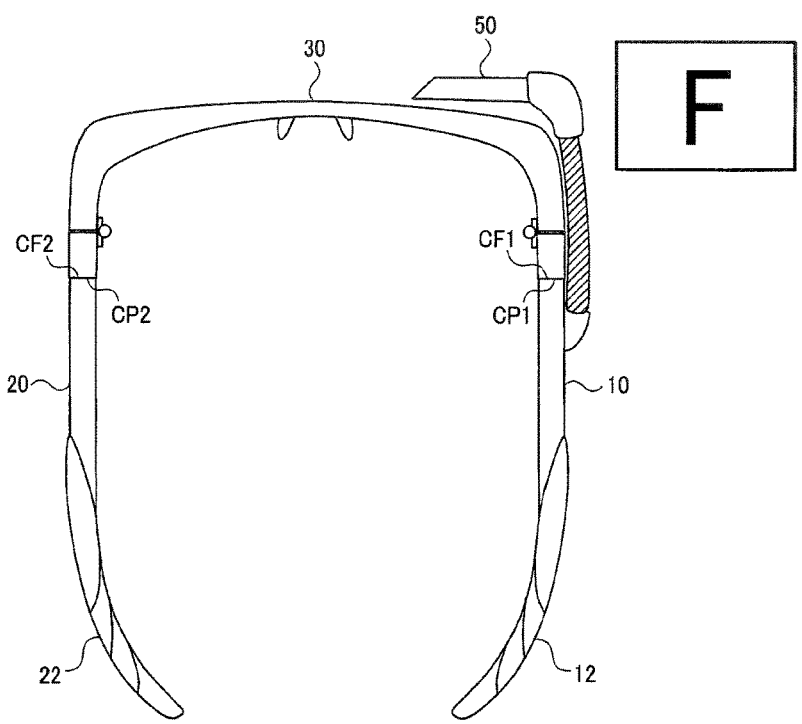
FIGS. 20A and 20B are views illustrating image processing based on a temple part type detection result.
Figure 20B:
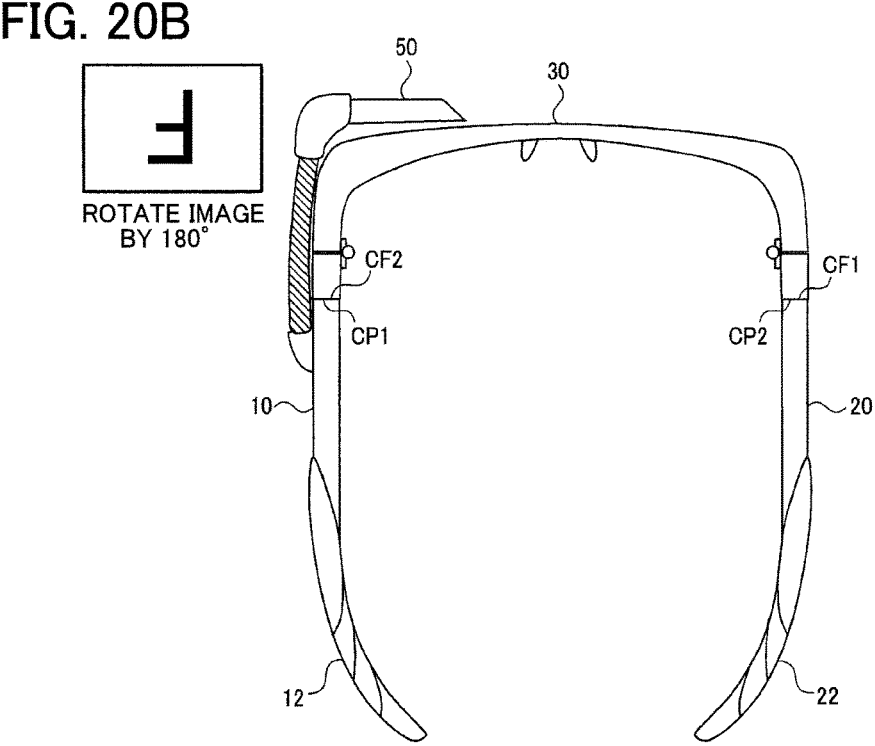

In FIGS. 20A and 20B, a process that rotates the image by 180° is performed as image processing. For example, the image is rotated by 180° around the center of the image. In FIG. 20A, the temple part 10 provided with the display device 50 is connected to the right side of the front part 30. In FIG. 20B, the temple part 10 provided with the display device 50 is connected to the left side of the front part 30. When the connection state is switched from the connection state illustrated in FIG. 20A to the connection state illustrated in FIG. 20B, the temple part 10 is rotated by 180°, and connected to the front part 30 (see above). Therefore, it is inconvenient for the user if the display device 50 displays an inverted image in the connection state illustrated in FIG. 20A and the connection state illustrated in FIG. 20B.

In order to deal with the above problem, the image (e.g., captured image) displayed on the display device 50 is rotated by 180° when the connection state has been switched from the connection state illustrated in FIG. 20A to the connection state illustrated in FIG. 20B. Specifically, the detection section 310 detects that the connection state has been switched from the connection state illustrated in FIG. 20A to the connection state illustrated in FIG. 20B, and the processing section 300 performs image processing that rotates the display image by 180° based on the detection result. This makes it possible to display a consistent image to the user even when the connection state has been switched from the connection state illustrated in FIG. 20A to the connection state illustrated in FIG. 20B.

Note that various processes may be performed as the process based on the temple part type detection result. For example, when the processing section 300 (microcomputer) is provided to the temple part 10, and an optional device (e.g., TV tuner or sensor) is provided to the temple part 20, the processing section 300 performs various processes corresponding to the type of the temple part 20 based on the detection result for the type of the temple part 20 connected to the front part 30. For example, when the processing section 300 has determined that the temple part 20 provided with a TV tuner has been connected to the front part 30, the processing section 300 performs a process that displays an image obtained by the TV tuner on the display device 50. When the processing section 300 has determined that the temple part 20 provided with a sensor (e.g., GPS sensor or acceleration sensor) has been connected to the front part 30, the processing section 300 performs a process corresponding to the sensor. Specifically, when the processing section 300 has determined that the temple part 20 provided with a GPS sensor has been connected to the front part 30, the processing section 300 performs a positioning process that utilizes the GPS sensor. When the processing section 300 has determined that the temple part 20 provided with an acceleration sensor has been connected to the front part 30, the processing section 300 performs an application process (e.g., step count determination process, or operation information acquisition process that utilizes the acceleration sensor) that utilizes the acceleration sensor.

Specifically, one embodiment of the invention implements an eyeglass-type wearable device that can be changed or enhanced in function by making it possible to connect a temple part that is provided with various optional devices. The processing section 300 determines the function that is changed or enhanced by the temple part by detecting the type of the temple part, and performs a process corresponding to the type of the temple part. This makes it possible to efficiently change or enhance the function of the eyeglass-type wearable device by replacing the temple part.

Note that the type of temple part may be detected in various ways. In FIG. 21A, the temple part 10 provided with a display device is connected to the right side of the front part 30, and the temple part 20 provided with a battery is connected to the left side of the front part 30. In this case, the power supply voltage VDD from the battery is supplied to the display device through the connection line LC1 of the front part 30 (see FIG. 10A).

In FIG. 21B, the temple part 10 provided with a display device is connected to the left side of the front part 30, and the temple part 20 provided with a battery is connected to the right side of the front part 30. In this case, the power supply voltage VDD from the battery is supplied to the display device through the connection line LC2 of the front part 30 (see FIG. 10B).

In FIGS. 21A and 21B, the detection section 310 detects the voltage of the connection lines LC1 and LC2, and the processing section 300 detects the types of the temple parts 10 and 20 connected to the front part 30 based on the voltage detection result.

In FIG. 21A, since the voltage of the connection line LC1 is detected to be the power supply voltage VDD, the processing section 300 can determine that the temple part 10 provided with a display device is connected to the right side of the front part 30, and the temple part 20 provided with a battery is connected to the left side of the front part 30. Therefore, the processing section 300 performs the control process so that the image illustrated in FIG. 20A is displayed on the display device.

In FIG. 21B, since the voltage of the connection line LC2 is detected to be the power supply voltage VDD, the processing section 300 can determine that the temple part 10 provided with a display device is connected to the left side of the front part 30, and the temple part 20 provided with a battery is connected to the right side of the front part 30. Therefore, the processing section 300 performs the control process so that the image illustrated in FIG. 20B is displayed on the display device. Specifically, the processing section 300 rotates the image displayed on the display device by 180°. This makes it possible to implement the process corresponding to the type of the connected temple part.

In FIG. 21C, processing sections 300-1 and 300-2 implemented by a microcomputer or the like are respectively provided to the temple parts 10 and 20. The processing sections 300-1 and 300-2 perform a communication process using a communication line LCM provided to the front part 30 (or perform a wireless communication process) to perform a temple part type determination process, for example. For example, the processing section 300-1 provided to the temple part 10 transmits type information about the temple part 10 to the processing section 300-2 through the communication line LCM. The processing section 300-2 provided to the temple part 20 transmits the type information about the temple part 20 to the processing section 300-1 through the communication line LCM. As illustrated in FIG. 21D, the process that should be performed by the processing sections 300-1 and 300-2 is linked to each temple ID (i.e., the type information about the temple part), and the processing sections 300-1 and 300-2 perform the process linked to each temple ID, for example. This makes it possible for the processing sections 300-1 and 300-2 to perform an appropriate process corresponding to the type of temple part.

For example, when it has been determined based on the temple ID that the temple part 10 is a display-system temple part provided with a display device, and the temple part 20 is a processing-system temple part, the processing sections 300-1 and 300-2 perform a process that displays the image subjected to image processing or the like by the temple part 20 on the display device provided to the temple part 10. When it has been determined based on the temple ID that the temple part 10 is a processing-system temple part, and the temple part 20 is a display-system temple part provided with a display device, the processing sections 300-1 and 300-2 perform a process that displays the image subjected to image processing or the like by the temple part 10 on the display device provided to the temple part 20. This makes it possible to implement an appropriate process corresponding to the type of each temple part connected to the front part.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The configuration, processing, and the like of the eyeglass-type wearable device, the temple part, and the front part are not limited to those described in connection with the above embodiments. Various modifications and variations may be made.

What is claimed is:

1. An eyeglass-type wearable device comprising:
a first temple part that is positioned along one temporal region of a user when the eyeglass-type wearable device is worn by the user;
a second temple part that is positioned along the other temporal region of the user when the eyeglass-type wearable device is worn by the user; and
a front part that is positioned in front of a face of the user when the eyeglass-type wearable device is worn by the user,
the front part including:
an electrical unit that includes at least an imaging device;
a first connection section to which the first temple part is detachably connected; and
a second connection section to which the second temple part is detachably connected,
wherein at least one of the first temple part and the second temple part including a temple-side electrical unit,
the first temple part and the second temple part being attachable to and detachable from the first connection section and the second connection section, respectively, of the front part,
image information about an image captured by the imaging device included in the front part being transmitted from the front part to the temple-side electrical unit included in the at least one of the first temple part and the second temple part,
the first connection section of the front part being configured to be attachable to either the second temple part or the first temple part,
the second connection section of the front part being configured to be attachable to either the first temple part or the second temple part;
the first connection section including a first electrical contact with which the front part and the first temple part are electrically connected with each other when the first temple part is attached to the front part, the second connection section including a second electrical contact with which the front part and the second temple part are electrically connected with each other when the second temple part is attached to the front part, the first temple part and the second temple part being electrically connected to each other when the first temple part and the second temple part are attached to the front part, and when the first temple part and second temple part are attached to the front part and the first temple part and the second temple part each include a battery as a temple-side electrical unit, the battery from the first temple part is not directly connected to the battery of the second temple part.

2. The eyeglass-type wearable device as defined in claim 1, the first temple part including a first temple-side electrical unit, the second temple part including a second temple-side electrical unit, and the image information from the imaging device being transmitted from the front part to at least one of the first temple-side electrical unit and the second temple-side electrical unit.

3. The eyeglass-type wearable device as defined in claim 2, the electrical unit included in the front part and at least one of the first temple-side electrical unit and the second temple-side electrical unit being electrically connected when the first temple part and the second temple part are connected to the first connection section and the second connection section of the front part.

4. The eyeglass-type wearable device as defined in claim 2, the image information from the imaging device being transmitted from the front part to the second temple-side electrical unit, the second temple-side electrical unit performing processing on the image information, and information obtained by the processing being transmitted from the second temple-side electrical unit to the first temple-side electrical unit.

5. The eyeglass-type wearable device as defined in claim 4, the first temple-side electrical unit including a display device, and the image information from the imaging device being transmitted from the front part to the second temple-side electrical unit, the second temple-side electrical unit performing image processing on the image information, and the image information subjected to the image processing being transmitted from the second temple-side electrical unit to the first temple-side electrical unit, and displayed on the display device included in the first temple-side electrical unit.

6. The eyeglass-type wearable device as defined in claim 2, the image information from the imaging device being transmitted from the front part to the first temple-side electrical unit and the second temple-side electrical unit.

7. The eyeglass-type wearable device as defined in claim 6, the first temple-side electrical unit including a display device, the image information from the imaging device being transmitted from the front part to the first temple-side electrical unit, and displayed on the display device included in the first temple-side electrical unit, and the image information from the imaging device being transmitted from the front part to the second temple-side electrical unit, and the second temple-side electrical unit performing at least one of image processing, storage processing, and external communication processing on the image information.

8. The eyeglass-type wearable device as defined in claim 1, the temple-side electrical unit included in the at least one of the first temple part and the second temple part including a display device, and the image information from the imaging device being transmitted from the front part to the temple-side electrical unit included in the at least one of the first temple part and the second temple part, and displayed on the display device included in the temple-side electrical unit included in the at least one of the first temple part and the second temple part.

9. The eyeglass-type wearable device as defined in claim 5, the display device including:

a display section;

an eyepiece optical system that allows the user to observe an image displayed on the display section as a virtual image; and a support section that supports an eye piece of the eyepiece optical system in front of the front part.

10. The eyeglass-type wearable device as defined in claim 1, wherein power supplied from the battery in at least one of the first temple part and second temple part being supplied from the temple-side electrical unit included in the at least one of the first temple part and the second temple part to the imaging device included in the front part.

11. The eyeglass-type wearable device as defined in claim 10, the battery in at least one of the first temple part and second temple part being provided to a temple tip part of the at least one of the first temple part and the second temple part.

12. The eyeglass-type wearable device as defined in claim 11, the at least one of the first temple part and the second temple part including:

the temple tip part that is provided with the battery in at least one of the first temple part and second temple part; and a connection section to which the temple tip part is removably connected.

13. The eyeglass-type wearable device as defined in claim 1, the first temple part being connected to the first connection section in a state in which a first side faces in a first direction, and a second side opposite to the first side faces in a second direction that is opposite to the first direction, and connected to the second connection section in a state in which the first side faces in the second direction, and the second side faces in the first direction, and the second temple part being connected to the second connection section in a state in which a first side faces in the second direction, and a second side opposite to the first side faces in the first direction, and connected to the first connection section in a state in which the first side faces in the first direction, and the second side faces in the second direction.

14. The eyeglass-type wearable device as defined in claim 1,
the first connection section including a first terminal and a second terminal,
the second connection section including a third terminal and a fourth terminal,
the first temple part including:
a first temple-side terminal that is connected to the first terminal of the first connection section when the first temple part is connected to the first connection section, and is connected to the fourth terminal of the second connection section when the first temple part is connected to the second connection section; and
a second temple-side terminal that is connected to the second terminal of the first connection section when the first temple part is connected to the first connection section, and is connected to the third terminal of the second connection section when the first temple part is connected to the second connection section, and
the second temple part including:
a third temple-side terminal that is connected to the third terminal of the second connection section when the second temple part is connected to the second connection section, and is connected to the second terminal of the first connection section when the second temple part is connected to the first connection section; and
a fourth temple-side terminal that is connected to the fourth terminal of the second connection section when the second temple part is connected to the second connection section, and is connected to the first terminal of the first connection section when the second temple part is connected to the first connection section.

15. A front part of an eyeglass-type wearable device that is positioned in front of a face of a user when the eyeglass-type wearable device is worn by the user, the front part comprising:
a first connection section to which a first temple part is connected, the first temple part being positioned along one temporal region of the user when the eyeglass-type wearable device is worn by the user;
a second connection section to which a second temple part is connected, the second temple part being positioned along the other temporal region of the user when the eyeglass-type wearable device is worn by the user; and
an electrical unit that includes an imaging device,
image information about an image captured by the imaging device being output from at least one of the first connection section and the second connection section,
the first connection section being configured to be attachable to either the second temple part or the first temple part, and
the second connection section being configured to be attachable to either the first temple part or the second temple part;
the first connection section including a first electrical contact with which the front part and the first temple part are electrically connected with each other when the first temple part is attached to the front part,
the second connection section including a second electrical contact with which the front part and the second temple part are electrically connected with each other when the second temple part is attached to the front part,
the first temple part and the second temple part being electrically connected to each other when the first temple part and the second temple part are attached to the front part, and
when the first temple part and second temple part are attached to the front part and the first temple part and the second temple part each include a battery as a temple-side electrical unit, the battery from the first temple part is not directly connected to the battery of the second temple part.

16. The front part as defined in claim 15, further comprising:
a connection line that electrically connects a first temple-side electrical unit provided to the first temple part and a second temple-side electrical unit provided to the second temple part when the first temple part and the second temple part are connected to the first connection section and the second connection section of the front part.

* * * * *